United States Patent
Takeda et al.

(10) Patent No.: US 11,540,320 B2
(45) Date of Patent: Dec. 27, 2022

(54) USER TERMINAL, RADIO BASE STATION AND RADIO COMMUNICATION METHOD

(71) Applicant: NTT DOCOMO, INC., Tokyo (JP)

(72) Inventors: Kazuaki Takeda, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/070,013

(22) PCT Filed: Jan. 12, 2017

(86) PCT No.: PCT/JP2017/000893
§ 371 (c)(1),
(2) Date: Jul. 13, 2018

(87) PCT Pub. No.: WO2017/122752
PCT Pub. Date: Jul. 20, 2017

(65) Prior Publication Data
US 2019/0037606 A1   Jan. 31, 2019

(30) Foreign Application Priority Data
Jan. 15, 2016 (JP) .............................. JP2016-006549

(51) Int. Cl.
*H04W 88/00* (2009.01)
*H04W 74/08* (2009.01)
(Continued)

(52) U.S. Cl.
CPC ....... *H04W 74/0833* (2013.01); *H04W 48/08* (2013.01); *H04W 68/00* (2013.01);
(Continued)

(58) Field of Classification Search
CPC combination set(s) only.
See application file for complete search history.

(56) References Cited

U.S. PATENT DOCUMENTS 9,179,409 B2   11/2015   Gupta et al.
2010/0027466 A1*   2/2010   Mustapha ............ H04J 11/0069
                                                                370/328
(Continued)

FOREIGN PATENT DOCUMENTS

CN   103052139 A   4/2013
EP   3308580 A1   4/2018
(Continued)

OTHER PUBLICATIONS

International Search Report issued in PCT/JP2017/000893 dated Mar. 7, 2017 (2 pages).
(Continued)

*Primary Examiner* — Lakeram Jangbahadur
(74) *Attorney, Agent, or Firm* — Osha Bergman Watanabe & Burton LLP

(57) ABSTRACT

In order to realize appropriate communications in a next generation communication system, the present invention provides a user terminal including: a reception section that receives broadcast information transmitted from a radio base station; and a control section that controls reception in a random access procedure. The reception section receives given broadcast information in the random access procedure. The given broadcast information may be broadcast information for a specific user terminal group.

5 Claims, 16 Drawing Sheets

(51) Int. Cl.
*H04W 88/06* (2009.01)
*H04W 48/08* (2009.01)
*H04W 68/00* (2009.01)
*H04W 68/02* (2009.01)
*H04W 72/00* (2009.01)
*H04W 72/04* (2009.01)
*H04W 88/02* (2009.01)
*H04W 88/08* (2009.01)

(52) U.S. Cl.
CPC ......... *H04W 68/02* (2013.01); *H04W 72/005* (2013.01); *H04W 72/042* (2013.01); *H04W 74/08* (2013.01); *H04W 88/06* (2013.01); *H04W 88/02* (2013.01); *H04W 88/08* (2013.01)

(56) References Cited

U.S. PATENT DOCUMENTS

| | | | |
|---|---|---|---|
| 2010/0128648 A1* | 5/2010 | Lee | H04W 74/0866 370/312 |
| 2012/0163311 A1* | 6/2012 | Park | H04W 72/1294 370/329 |
| 2012/0176995 A1* | 7/2012 | Parkvall | H04W 72/02 370/329 |
| 2012/0320842 A1 | 12/2012 | Jeong et al. | |
| 2012/0320874 A1* | 12/2012 | Li | H04W 48/12 370/331 |
| 2013/0039309 A1* | 2/2013 | Chiu | H04W 48/08 370/329 |
| 2013/0258938 A1 | 10/2013 | Sagfors et al. | |
| 2014/0153417 A1* | 6/2014 | Gupta | H04W 52/0219 370/252 |
| 2014/0162646 A1* | 6/2014 | Lee | H04W 74/0833 455/435.2 |
| 2014/0233530 A1* | 8/2014 | Damnjanovic | H04W 74/006 370/331 |
| 2015/0011215 A1* | 1/2015 | Uemura | H04W 36/34 455/436 |
| 2015/0223267 A1* | 8/2015 | Damnjanovic | H04W 48/12 370/329 |
| 2015/0351132 A1* | 12/2015 | Park | H04W 74/0833 370/336 |
| 2016/0021646 A1* | 1/2016 | Hu | H04W 52/28 370/329 |
| 2016/0165640 A1* | 6/2016 | Yang | H04W 74/08 370/336 |
| 2016/0219493 A1* | 7/2016 | Kim | H04W 4/60 |
| 2016/0381712 A1* | 12/2016 | Yang | H04W 72/0446 370/329 |
| 2017/0164410 A1* | 6/2017 | Takeda | H04W 72/04 |
| 2017/0181214 A1* | 6/2017 | Kim | H04W 8/28 |
| 2018/0220290 A1* | 8/2018 | Sivavakeesar | H04W 8/065 |
| 2018/0288683 A1 | 10/2018 | Bendlin et al. | |

FOREIGN PATENT DOCUMENTS

| | | |
|---|---|---|
| WO | 2014/088846 A1 | 6/2014 |
| WO | 2015/012664 A1 | 1/2015 |
| WO | 2015/012666 A1 | 1/2015 |
| WO | 2015/163712 A1 | 10/2015 |
| WO | 2016/003140 A1 | 1/2016 |

OTHER PUBLICATIONS

Written Opinion of the International Searching Authority issued in PCT/JP2017/000893 dated Mar. 7, 2017 (5 pages).
3GPP TS 36.300 V12.4.0; "3rd Generation Partnership Project; Technical Specification Group Radio Access Network Evolved; Universal Terrestrial Radio Access (E-UTRA) and Evolved Universal Terrestrial Radio Access Network (E-UTRAN); Overall description; Stage 2 (Release 12)"; Dec. 2014 (251 pages).
Extended European Search Report issued in counterpart European Patent Application No. 17738505.1, dated Jun. 7, 2019 (13 Pages).
Office Action issued in Chinese Application No. 201780006704.1; dated Jul. 8, 2020 (21 pages).
Office Action issued in European Application No. 17738505.1; dated Jul. 31, 2020 (8 pages).
Office Action issued in the counterpart European Patent Application No. 17738505.1, dated Nov. 5, 2020 (10 pages).
Office Action issued in the counterpart Japanese Patent Application No. 2017-561173, dated Feb. 16, 2021 (9 pages).

* cited by examiner

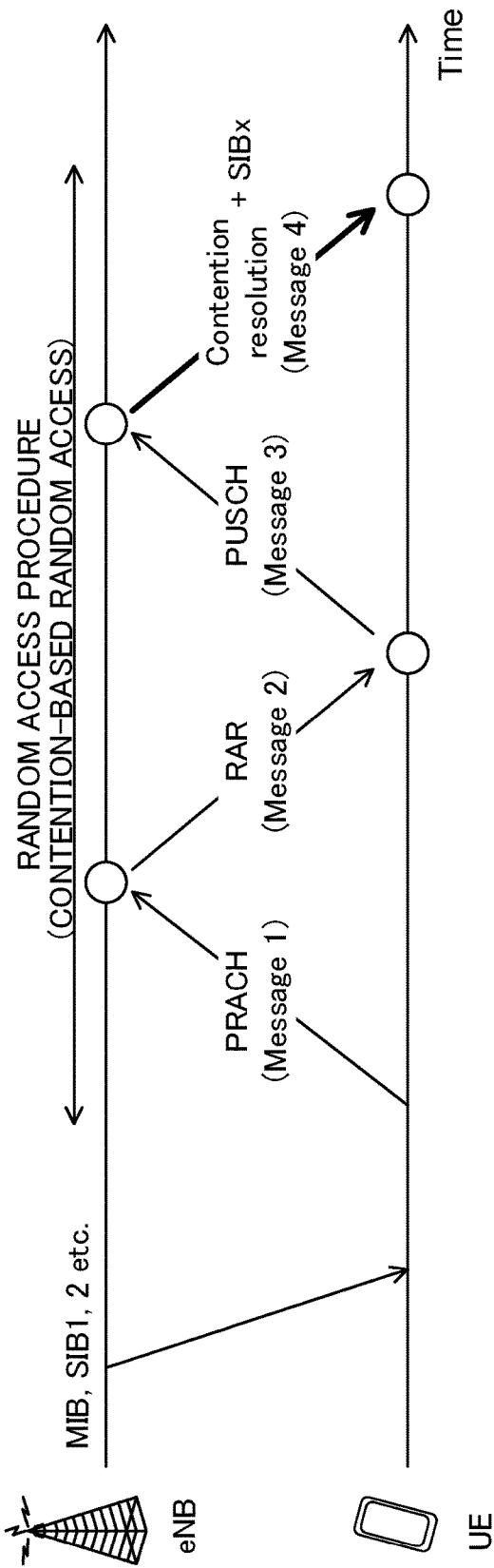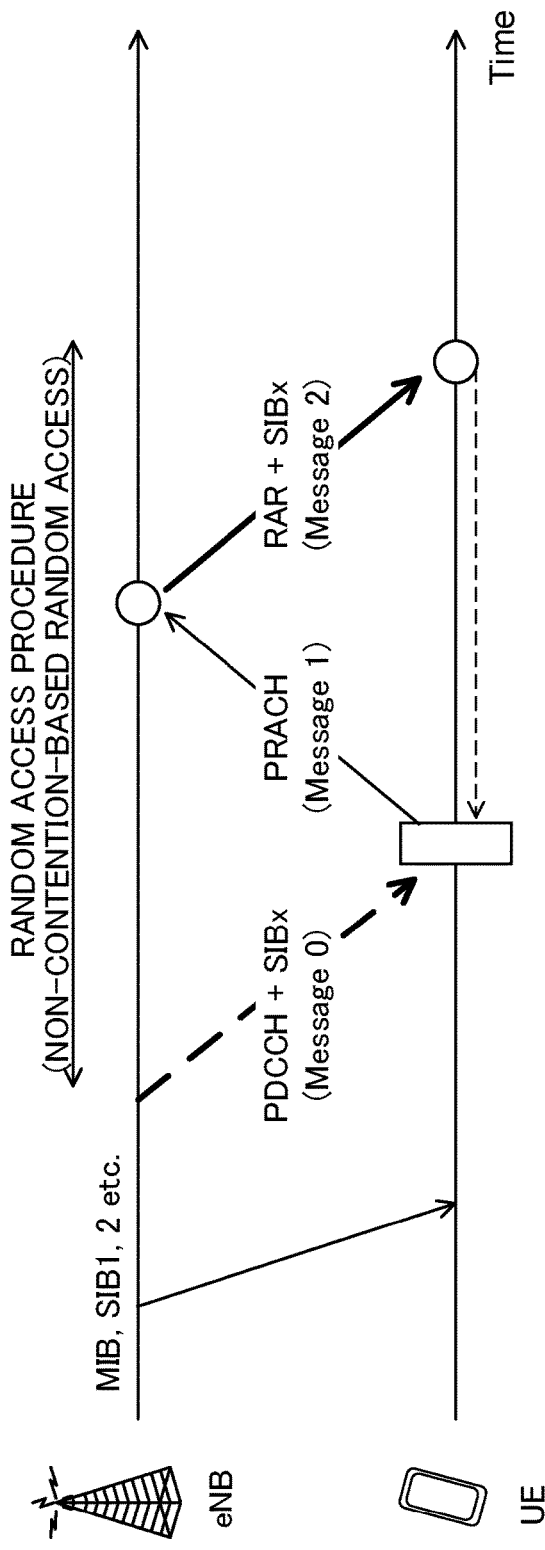

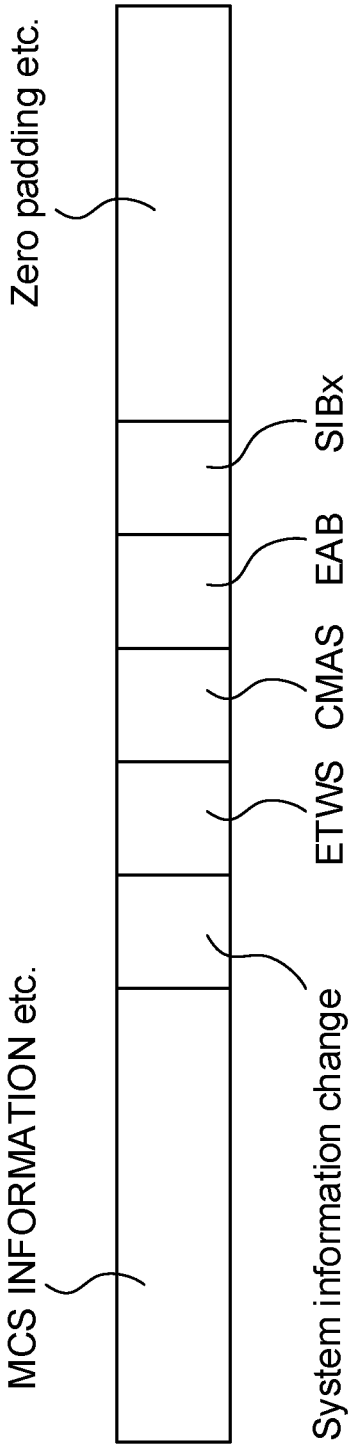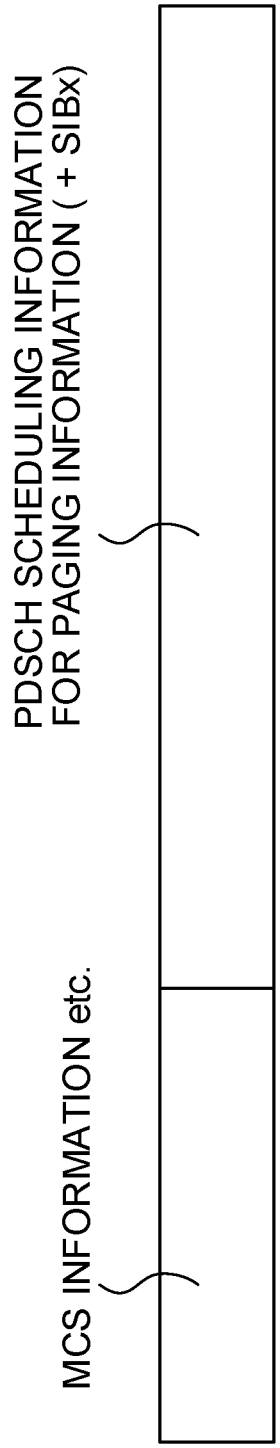

USER TERMINAL, RADIO BASE STATION AND RADIO COMMUNICATION METHOD

TECHNICAL FIELD

The present invention relates to a user terminal, a radio base station and a radio communication method in a next-generation communication system.

BACKGROUND ART

In a UMTS (Universal Mobile Telecommunications System) network, for the purposes of achieving higher-speed data rates, providing low delay and so on, long-term evolution (LTE) has been standardized (see Non Patent Literature 1). For the purposes of achieving further broadbandization and higher speed beyond LTE (also called LTE Rel. 8), LTE Advanced (also called Rel. 10, 11 or 12) has been standardized and successor systems to LTE (LTE Rel. 13 or later) have been also studied.

In LTE Rel. 10/11, in order to achieve broadbandization, there has been introduced carrier aggregation (CA) in which a plurality of component carriers (CCs) are aggregated. Each CC corresponds one unit of the system band of LTE Rel. 8. In CA, a user terminal (UE: User Equipment) is configured with a plurality of CCs of the same radio base station (eNB: eNodeB).

On the other hand, there has been also introduced dual connectivity (DC) in which UE is configured with a plurality of cell groups (CGs) of different radio base stations. Each cell group consists of at least one cell (CC). Since a plurality of CCs of different radio base stations are aggregated in DC, DC is also called inter-eNB CA.

In these LTE Rel. 8 through 12, transmission time interval (TTI) applied to DL transmission and UL transmission between a radio base station and a user terminal is controlled to be set to 1 ms. The transmission time interval is also called transmit time interval and TTI in the LTE system (Rel. 8-12) is also called subframe length.

CITATION LIST

Non Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall description; Stage 2"

SUMMARY OF INVENTION

Technical Problem

For example, in a future radio communication system (for example, 5G), there have been expected communication in a high frequency band in which broad band is easily available (for example, several tens GHz band) and communication of relatively small traffic used for IoT (Internet of Things), MTC (Machine Type Communication), M2M (Machine To Machine) and so on. Furthermore, there are also increasing demands for V2V (Vehicular To Vehicular) communication and D2D (Device To Device) requiring low delay communication.

Further, 5G is target for a broad frequency as a carrier frequency (for example, 100 GHz) and a new radio access scheme (New RAT (Radio Access Technology)) suitable for high frequency bands has been considered to be designed.

For example, in 5G RAT, introduction of a plurality of different numerologies has been considered. The numerology denotes a set of communication parameters featuring a signal design in RAT and RAT design.

However, if the radio communication system used in the existing radio communication system (for example, LTE Rel. 8-12) is to be applied as it is to New RAT, there may be a problem of deterioration of communication quality, which prevents appropriate communications. For example if, in a future radio communication system, information to notify a specific user terminal group in a future radio communication system is transmitted in the same manner as broadcast information of the existing system, there may be increase in overhead of the broadcast information and accordingly, reduction of throughputs.

The present invention was carried out in view of the foregoing and aims to provide a user terminal, a radio base station and a radio communication method capable of realizing appropriate communications in a next-generation communication system.

Solution to Problem

The present invention provides a user terminal comprising: a reception section that receives broadcast information transmitted from a radio base station; and a control section that controls reception in a random access procedure, wherein the reception section receives given broadcast information in the random access procedure.

Advantageous Effects of Invention

According to the present invention, it is possible to realize appropriate communication in a next-generation communication system.

BRIEF DESCRIPTION OF DRAWINGS

FIGS. 7A and 7B are diagrams illustrating another example of the random access procedure according to the first embodiment;

FIGS. 10A and 10B are diagrams illustrating another example of transmission of paging information according to the second embodiment;

DESCRIPTION OF EMBODIMENTS

As the access scheme used in future new communication systems (which may be called 5G RAT, New RAT or the like), there has been studied an extension to the access scheme used in the existing LTE/LTE-A system (also called LTE RAT, LTE-Based RAT).

Figure 1A:
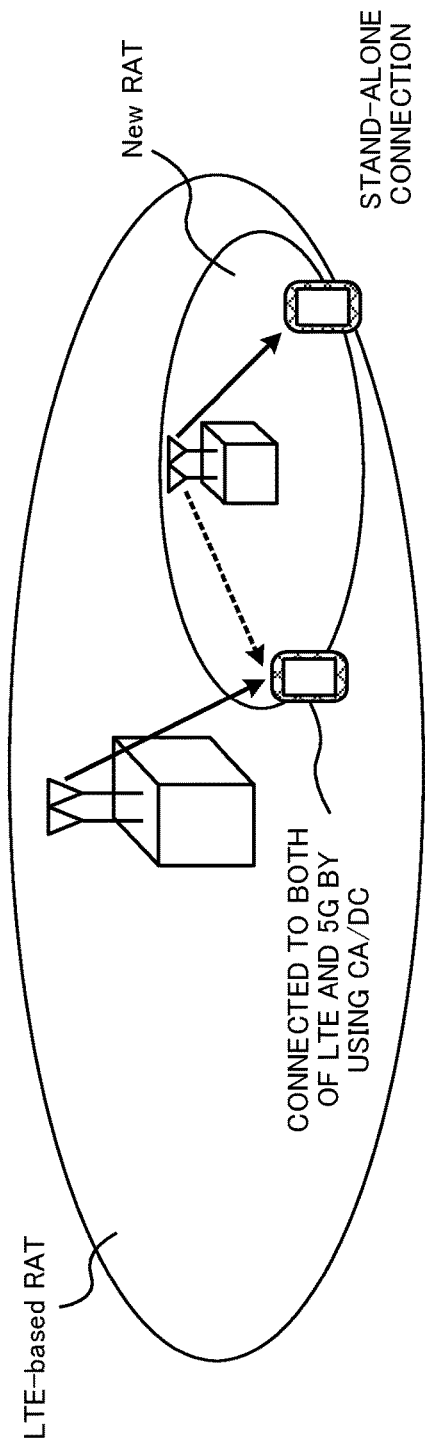
FIGS. 1A and 1B are diagrams illustrating an example of operation of a future radio communication system.

A New RAT cell may be arranged overlapping the coverage of the LTE RAT cell or may be arranged independently. FIG. 1A illustrates the New RAT cell overlaps the coverage of the LTE-based RAT cell.

The user terminal is considered to be connected to both of the LTE system and 5G system by using carrier aggregation (CA) and/or dual connectivity (DC). Further, in New RAT, operation of stand-alone has been also expected. Stand-alone means that the user terminal operates (camps on) in New RAT alone. In this case, the user terminal is able to have initial connection with respect to the New RAT.

In New RAT, a radio frame and/or a subframe configuration that is different from that of the LTE RAT may be used. For example, the radio frame configuration of New RAT may be different from the radio frame configuration of the existing LTE (LTE Rel. 8 through 12) in at least one of the subframe length, symbol length, subcarrier interval, and system bandwidth.

Note that the subframe may be called transmission time interval (TTI). For example, the TTL (subframe) length in LTE Rel. 8 through 12 is 1 ms and consists of two time slots. TTI is a transmission time unit of a channel coded data packet (transport block) and is used as a processing unit of scheduling and link adaptation, etc.

More specifically, in New RAT, there has been decided a new radio parameter, and for example, there has been also considered a method of using a fixed number times as large as communication parameters (for example, subcarrier interval, bandwidth, symbol length and so on) for defining the LTE radio frame (for example, N times or 1/N times), based on numerology of LTE RAT. Here, the numerology represents a set of communication parameters featuring a signal design and RAT design in a RAT. It may be possible that a plurality of numerologies may be defined and used for one RAT.

Figure 1B:
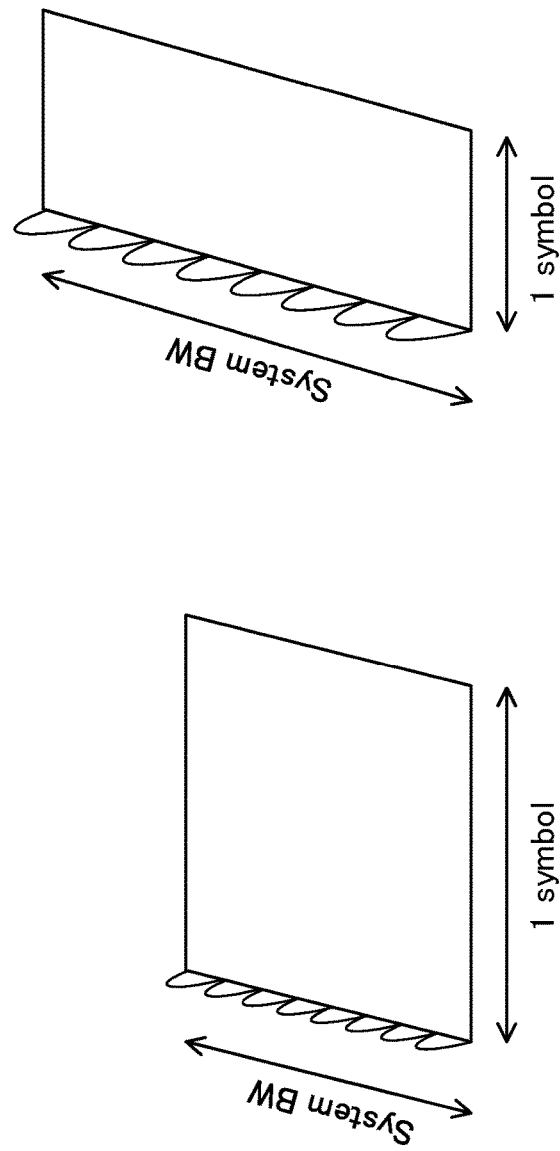

Further, when stating that a plurality of numerologies are different, it means that they are different at least one of the following items (1) to (6). However, the items are not limited to them.
(1) subcarrier interval,
(2) CP (Cyclic Prefix) length,
(3) symbol length,
(4) the number of symbols per TTI
(5) TTI length
(6) filtering processing or windowing processing Thus in New RAT, an extremely wide frequency (for example, 1 GHz-100 GHz) is targeted as a carrier frequency and therefore, it is considered that there are supported and coexist a plurality of numerologies that are different in symbol length, subcarrier interval or the like depending on the required condition per use application (see FIG. 1B). FIG. 1B illustrates an example of two numerologies that are different in subcarrier interval, symbol length and system bandwidth.

As an example of numerologies used in New RAT, it is considered that the subcarrier interval and bandwidth is multiplied by N (for example, N>1) with reference to LTE RAT and the symbol length is multiplied by 1/N (see the right side view of FIG. 1B).

Since the subframe configuration (TTI configuration) has a greater subcarrier interval and a shorter symbol length than the subframe configuration of the LTE RAT, it is possible to reduce the processing delay in control and shorten the delay time. Note that a shorter TTI (for example, TTI of less than 1 ms) than TTI used in LTE may be called short TTI. According to the configuration at the right side of FIG. 1B, the TTI length is made longer, which makes it possible to shorten the time for transmission and reception and to realize reduction of the delay easily. Further, the subcarrier interval is made greater than that of the existing LTE, it is possible to reduce the influence of phase noise in the high frequency band and reduce the influence of the Doppler frequency. With this configuration, it is possible to introduce New RAT into the high frequency band (for example, several-ten GHz band) where a broadband is easily available and to use Massive MIMO using a large number of antenna elements, thereby realizing high-speed communications appropriately.

Further, as another example of numerologies, it may be considered that the subcarrier interval is multiplied by 1/N times and the symbol length is multiplied by N times (for example, see the left side of FIG. 1B). According to this configuration, the entire length of the symbols is increased, and even if the ratio of the CP (Cyclic Prefix) length occupying the whole length of the symbols is fixed, the CP length is allowed to be longer. With this configuration, it is possible to perform robust radio communications against fading in the communication channel.

In future radio communication systems, there may be service formats in which service is provided by changing a plurality of numerologies per given time period or by using a given numerology only for a specific user terminal (user terminal group). As an example of the service, FIG. 2 shows numerologies to be used for each frequency band are switched depending on the period of FIG. 2.

Figure 2A:
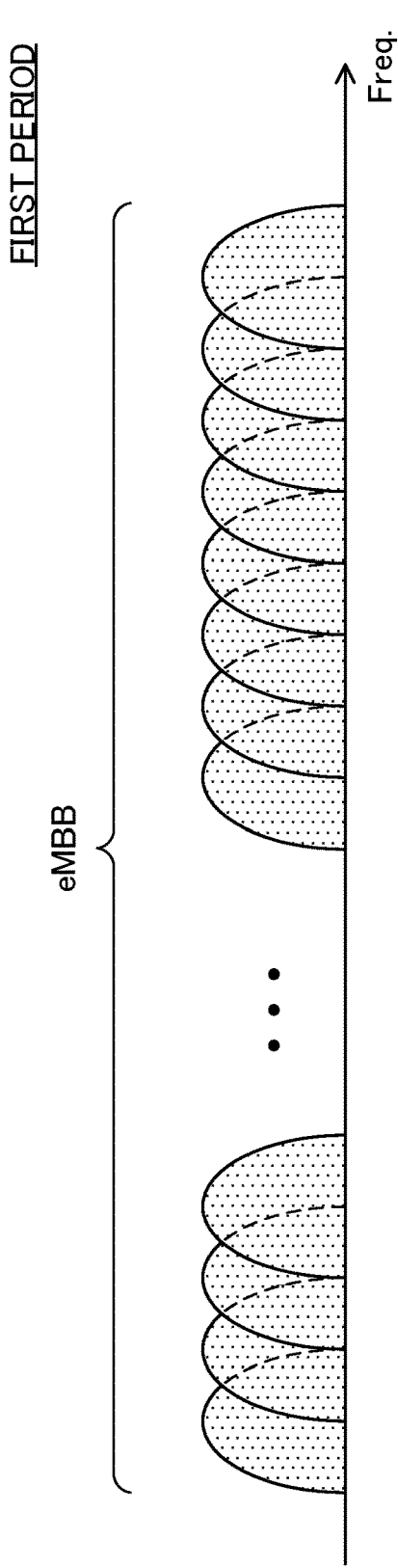
FIGS. 2A and 2B area diagrams illustrating another example of operation of a future radio communication system.
Figure 2B:
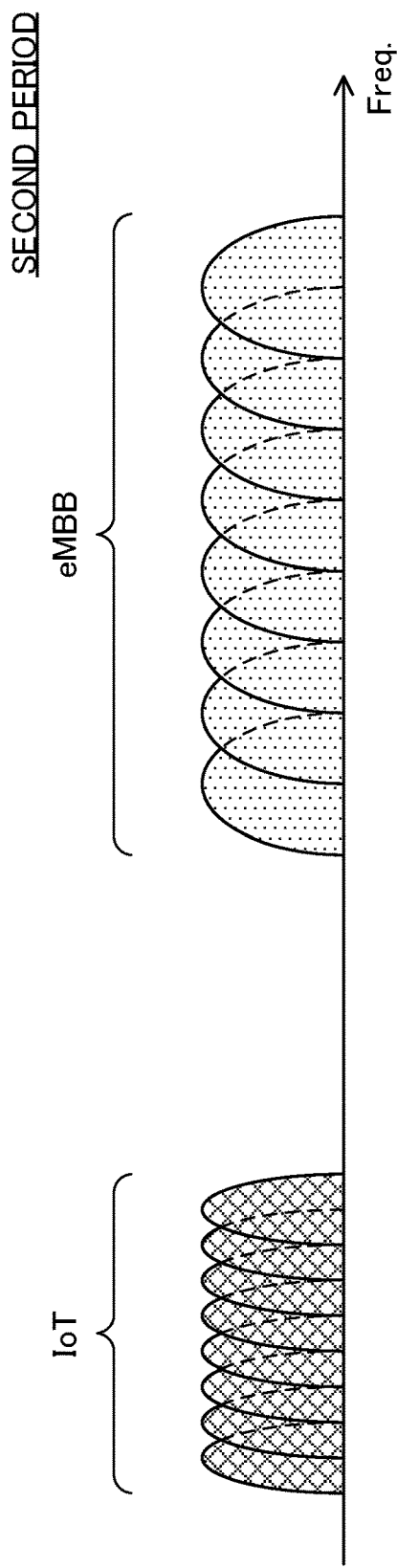

In FIG. 2, communication in the first period (for example, daytime) is performed using a numerology tailored to mobile broad band (MBb) in a given frequency area (see FIG. 2A). On the other hand, communication in the second period (for example, nighttime) is performed using numerologies tailored to IoT (for example, smart meter, etc.) in given frequency areas (for example, low frequency area side) (see FIG. 2B). The communication in the second period assumes is based on use of a plurality of numerologies in different frequency areas.

In this case, information about numerologies (here, information about the multiple numerologies) needs to be provided to the user terminal. Information about the numerologies may be, for example, at least one of subcarrier interval, CP length, symbol length, the number of symbols per TTI, TTI length and information about a bandwidth, etc.

Further, when a broadcast service (Broadcast service) is provided using a given numerology, information about such a broadcast service (for example, MBMS control information, etc.) needs to be provided to the user terminal. For example, when the information is transmitted to a subscriber via network, the information about the broadcast service is considered to be provided to a plurality of user terminals as subscribers.

In this way, the information used by multiple user terminals is considered to be transmitted as broadcast information from the radio base station to the user terminals. In the existing LTE system, the radio base station transmits broadcast information that needs to be transmitted to a plurality of user terminals (for example, system information (SI)) by including it in a master information block (MIB) or system information block (SIB) repeatedly.

In the existing LTE system (for example, Rel. 12), multiple-kind SIBs (for example, SIB 1 to SIB 19) are defined, and each SIB is mapped to a different system information message SI (SI window). Each SI window is transmitted in a different transmission cycle, and one or a plurality of SIBs are mapped to the same SI window and are transmitted to the user terminal. When the user terminal obtains system information defined in SIB, it first receives SIB 1.

Then, it may be considered that information to provide to a plurality of user terminals (for example, information about numerologies and/or information about broadcast services, etc.) is transmitted together with broadcast information of the existing system (PBCH, SIB, etc.). For example, information about numerologies and/or information about broadcast services may be added to the existing MIB or SIB and transmitted repeatedly from the radio base station to the user terminal.

However, the present inventors have noted that the information about numerologies and/or information about broadcast services may only have to be transmitted selectively to a specific user terminal (UE group) and needs not to be transmitted to all the user terminals. For example, as illustrated in FIG. 2, when a different numerology is used in a switching manner per a given period, the time period where the user terminal needs to obtain information about numerologies is limited as well. Furthermore, if it is necessary to provide a broadcast service only to a specific user terminal, the information about the broadcast service may have to be transmitted to specific user terminals (only to subscribers).

If information required for a specific user terminal (information of individual UE group) is transmitted periodically by using a cell-specific broadcast signal (PBCH, SIB, etc.), there may be increase in overhead of the cell-specific broadcast information, which causes reduction in communication efficiency. On the other hand, the information about numerologies and/or the information bout broadcast services is preferably provided not only to a user terminal in an RRC connection state, but also to a user terminal in an RRC idle state.

Then, the present inventors have found, as one embodiment of the present invention, the idea that in the operation for the user terminal to achieve synchronization (for example, random access procedure), information directed to a specific user terminal is provided from the radio base station to the user terminal. That is, information about numerologies and/or information about broadcast services are configured to be provided to the user terminal in different operation and timing from those of the existing broadcast information. With this configuration, it is possible to reduce overheads of the existing broadcast information (cell-specific broadcast information) and increase the communication usage efficiency.

Further, as another embodiment of the preset invention, the present inventors have found an idea that information about a specific user terminal is included in paging information (paging message) and provided from the radio base station to a user terminal. With this structure, it is possible to suppress increase of overhead of existing broadcast information (MIB, SIB, etc. and thereby enhance the communication usage efficiency.

The following description is made about details of the present embodiment. In the following description, information directed to a specific terminal is provided to a user terminal as given broadcast information (or, it may be also called a part of broadcast information, aperiodic broadcast information, aperiodic PBCH) in a different operation or timing from the existing broadcast information, but the present embodiment is not limited to this. The information directed to a specific terminal is not limited to the broadcast information (for example, SIBx), but may be other information (for example, a part of system information, UE group specific information, etc.). Further, the information directed to a specific terminal is not limited to the information about numerologies and information about broadcast services.

Furthermore, the following description treats the case of transmitting given broadcast information by using the random access procedure or paging information of the LTE system, but this is not intended to limit the present invention. The present embodiment is also applicable to the same operation in other systems (synchronization operation, notification operation of system information and emergency quick report, etc.). The embodiments described below may be performed alone or in combination appropriately.

First Embodiment

In the first embodiment, it is assumed that information directed for a specific user terminal (given broadcast information, aperiodic broadcast information or aperiodic PBCH) is provided from a radio base station to a user terminal in the random access procedure.

In the existing LTE system (Rel. 8-12), the random access procedure is supported so that the user terminal can perform initial connection, synchronization establishment, communication resume. In the random access procedure, the user terminal is defined as transmitting a physical random access channel (PRACH) and receiving a random access response (also called RA response, random access response, RAR, etc.) for the PRACH.

The random access can be classified into two types of contention-based random access (CBRA) and non contention-based random access (Non-CBRA). Here, the Non-CBRA may be called contention-free random access (CFRA).

In the CBRA, the user terminal transmits by PRACH a preamble selected randomly from a plurality of random access preambles prepared in a cell. On the other hand, in the non-CBRA, the user terminal transmits, by PRACH, a UE-specific random access preamble (dedicated preamble) allocated in advance by the network. In the non-CBRA, user terminals are allocated different random accesses, which enables suppression of occurrence of collision.

Figure 3:
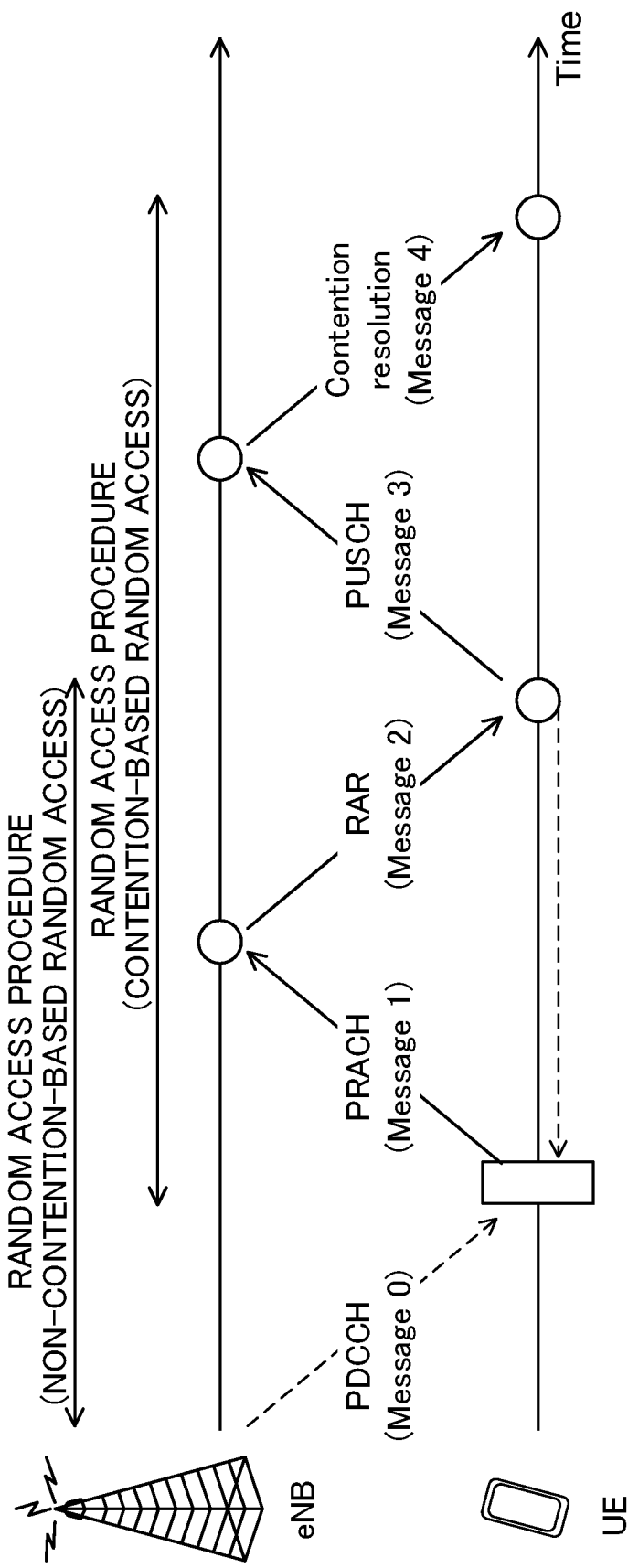
FIG. 3 is a diagram for explaining the random access procedure in the existing system.

The CBRA is performed when performing initial connection, starting or resuming uplink communication, etc. The non CBRA is performed when performing handover, starting or resuming downlink communication, etc. FIG. 3 illustrates the outline of random access. The CBRA consists of Step 1 to Step 4 and the non CBRA consists of Step 0 to Step 2.

In the case of CBRA, the user terminal first transmits a random access preamble (PRACH) in a PRACH resource configured for the cell (message (Msg) 1). When detecting a random access preamble, the radio base station transmits a random access response (RAR) in response thereto (message 2). After transmitting the random access preamble, the user terminal tries receiving message 2 during a given interval. When reception of the message 2 is filed, the transmission power of PRACH is increased to transmit the message 1 again (retransmit the message 1). Increase of transmission power in signal retransmission is also called power ramping.

When receiving a random access response, the user terminal transmits a data signal by using an uplink shared channel (PUSCH) designated by uplink grant included in the random access response (message 3). When receiving message 3, the radio base station transmits a contention resolution message to the user terminal (message 4). The user terminal establishes synchronization by messages 1 to 4 and when the radio base station is identified, the CBRA process is completed and connection is established.

In the case of non CBRA, first, the radio base station transmits to the user terminal a physical downlink control channel (PDCCH-order) indicating transmission of PRACH (message 0). The user terminal transmits a random access preamble (PRACH) at the timing indicated by the PDCCH (message 1). When detecting the random access preamble, the radio base station transmits a random access response (RAR) that is response information (message 2). When the user terminal receives the message 2, the non CBRA processing is completed. Here, like the CBRA, when reception of the message 2 is failed, transmission of power of the PRACH is increased and the message 1 is transmitted again.

Note that transmission of a random access preamble (message 1) by using the PRACH may be called PRACH transmission, and reception of a random access response (message 2) by using the PRACH may be called PRACH.

In the first embodiment, in the random access procedure, the given broadcast information (for example, a part of broadcast information SIBx) is provided to the user terminal by using at least one of messages 0, 2 and 4. In this case, the user terminal is able to receive broadcast information (for example, MIB, SIB1, 2, etc.) in the existing system before the random access procedure and to receive information for a specific user terminal (for example, SIBx) in the random access procedure. In the following description, it is assumed as an example that given broadcast information is transmitted in each message in the random access.

[Message 2]

Figure 4:
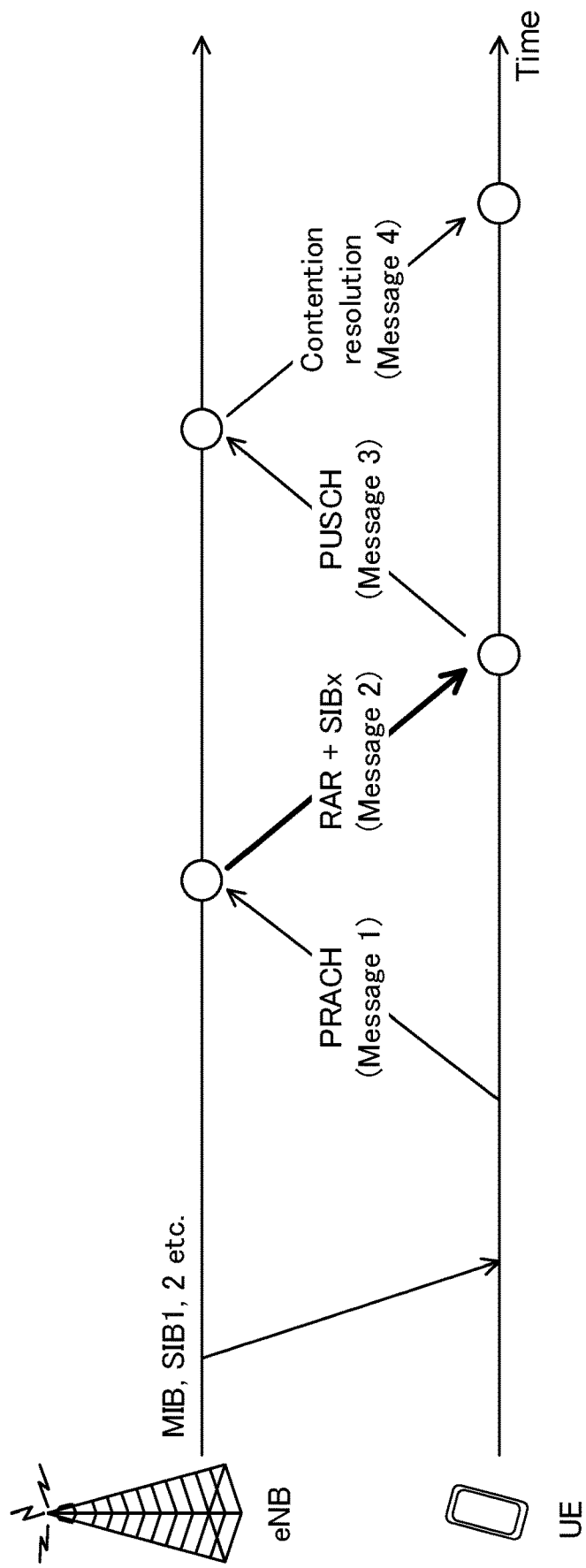
FIG. 4 is a diagram illustrating an example of the random access procedure according to a first embodiment.

FIG. 4 illustrates the case where the radio base station provides the user terminal with given broadcast information in a random access response (message 2). Transmission of a random access response (RAR) consists of transmission of downlink control information for RAR (DCI) by a downlink control channel (for example, PDCCH, EPDCCH, MPDCCH, etc.) and transmission of MAC PDU (Medium Access Control Protocol Data Unit) for RAR by a downlink shared channel (for example, PDSCH).

The radio base station is able to transmit given broadcast information by using a downlink control channel and/or a downlink shared channel for RAR. Note that the radio base station is able to transmit DCI in a common search space (CSS) for RAR.

Further, when transmitting a downlink control channel for RAR, the radio base station is able to perform masking by applying RA-RNTI (Random Access Radio Network Temporary Identifier). When transmitting given broadcast information by a downlink shared channel, the given broadcast information may be multiplexed with other RAR recodes to be transmitted to the user terminal.

The user terminal tries receiving a response signal (for example, PDCCH, EPDCCH, MPDCCH) masked by RA-RNTI during a given interval (timing window). RA-RNTI is able to be determined based on a subframe number $t_{id}$ (for example, 0 to 9) to transmit the random access preamble and a frequency resource number $f_{id}$ (for example, 0 to 5). For example, RA-RNTI is determined using the following equation (1).

$$RA\text{-}RNTI = 1 + t_{id} + 10 \times f_{id} \qquad \text{Equation (1)}$$

In the first embodiment, in the random access response, RNTI defined for a specific user terminal (specific UE group) may be used to perform RAR. For example, in the random access response, the radio base station transmits a downlink control channel masked by a given RNTI that is defined for a specific user terminal. The user terminal receives a downlink control channel by using the given RNTI so that the user terminal can receive given broadcast information included in the downlink control channel and/or given broadcast information included in a downlink shared channel of which allocation is designated by the downlink control channel.

The given RNTI may be determined using a different calculation formula from RA-RNTI of the existing system (for example, equation in which parameters are changed in the above-mentioned equation (1)), or it may be defined in advance. Or, timing window to try receiving PRP for a specific user terminal may be configured separately. Thus, as transmission and reception of given broadcast information is controlled by configuring RNTI for RAR for a specific user terminal and/or timing window, the specific user terminal is able to receive message 2 included in the given broadcast information selectively.

The user terminal may control reception processing of the message 2 by using both of the existing RA-RNTI and the RNTI defined for a specific user terminal, or the user terminal may control the reception processing of the message 2 based on either of the RA-RNTI and RNTI depending on the user capability. For example, the user terminal performing the reception processing of message 2 by using RNTI defined for the specific user terminal may be configured not to perform the reception processing of message 2 using the existing RA-RNTI.

[Message 4]

Figure 5:
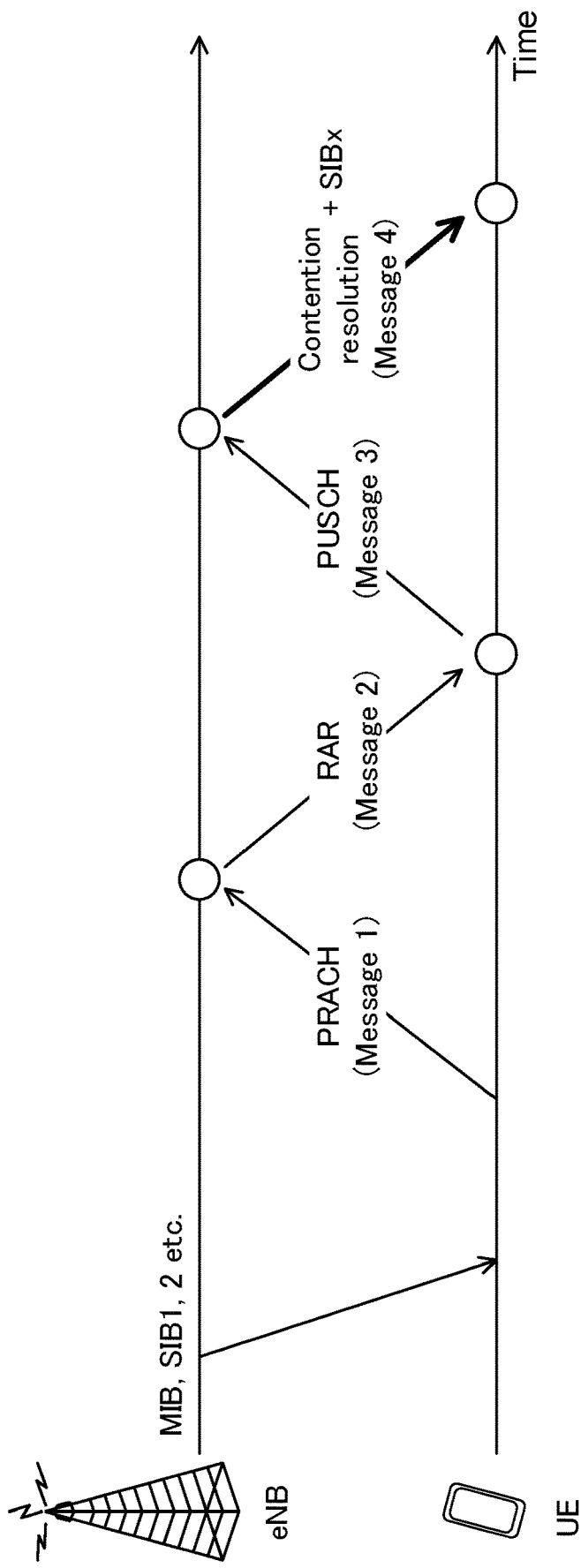
FIG. 5 is a diagram illustrating another example of the random access procedure according to the first embodiment.

FIG. 5 illustrates that the radio base station provides given broadcast information to the user terminal in contention resolution (message 4). Transmission of the message 4 may be configured of transmission of a downlink control channel (for example, PDCCH, EPDCCH, MPDCCH, etc.) and/or transmission of a downlink shared channel. Further, when transmitting a downlink control channel of message 4, the radio base station is able to perform masking by applying Temporary C-RNTI or C-RNTI. Temporary C-RNTI may be provided from the radio base station to the user terminal in message 2.

When the user terminal transmitting the message 4 is a specific user terminal, the radio base station is able to transmit message 4 including given broadcast information. In this case, the radio base station is able to transmit the given broadcast information in a downlink control channel and/or a downlink shared channel of message 4.

The user terminal is able to receive message 4 by using Temporary C-RNTI received in the message 2 or by using already obtained C-RNTI and obtain given broadcast information (SIBx).

[Message 0]

Figure 6:
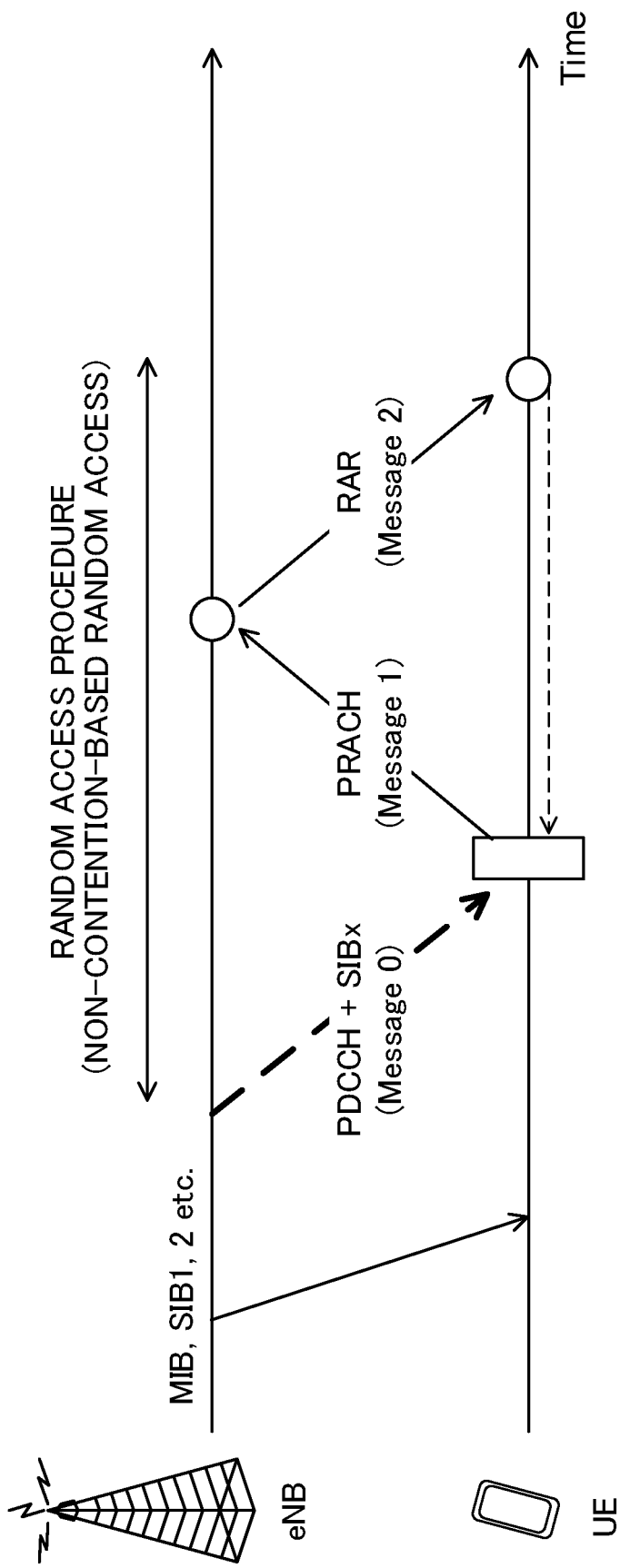
FIG. 6 is a diagram illustrating yet another example of the random access procedure according to the first embodiment.

In the case of non CBRA, the radio base station transmits a physical downlink control channel (PDCCH-order) indicating transmission of PRACH to the user terminal (message 0). In this case, the radio base station is able to provide a downlink control channel that indicates PRACH transmission in message 0 by including the broadcast information in the downlink control channel (see FIG. 6).

By providing the given broadcast information to the user terminal in the message 0, it is possible to use numerologies suitable for each use case of signals of message 1 or later and service type.

Modified Embodiment

Further, the radio base station may control the timing to transmit given broadcast information in accordance with the type of random access procedure. For example, it may be configured that in the case of CBRA, the radio base station transmits the given broadcast information in the message 4, and in the case of non-CBRA, the radio base station transmits the given broadcast information in the message 0 and/or the message 2 (see FIGS. 7A and 7B).

In the case of CBRA, there may be collision between user terminals. Therefore, by transmitting given broadcast information in message 4, it is possible to provide the given broadcast information appropriately to the user terminal.

<RACH Preamble>

In the random access procedure, the user terminal transmits PRACH (message 1). In this case, PRACH the user terminal transmits in message 1 may be divided into a plurality of sequence groups and/or a plurality of resources allowed to transmit PRACH may be configured. The plural sequence groups and/or plural resources may be configured in association with respective services provided in the communication system (or respective numerologies).

The plural services (numerologies) include, for example, a service using MBB, a service using IoT, a service using URLLC (Ultra-reliable and low latency communication). These services may be associated with different PRACH sequences and/or different services. Association between the plural sequence groups and/or plural resources and the respective services may be defined in advance in the specifications or may be provided to the user terminal by using a given signal (for example, cell-specific broadcast information or the like).

When starting the communication, the user terminal is able to transmit PRACH by using a sequence group and/or resource associated with a service that the user terminal wishes to use. The network (radio base station) is able to determine given broadcast information (SIB information) to transmit in message 2 and/or message 4 based on the sequence group and/or resource of PRACH received from the user terminal.

For example, it is assumed that the first service is associated with the first sequence (and/or first resource) and the second service is associated with the second sequence (and/or second resource). In this case, the user terminal that wishes application of the first service transmits PRACH transmission by using the first sequence (and/or the first resource) in the message 1. The radio base station knows that the user terminal wishes to use the first service based on the type of PRACH transmitted from the user terminal, and then, the radio base station provides the user terminal with given broadcast information required to use the first service by including it in the message 2 and/or message 4.

With this configuration, the radio base station is able to transmit broadcast information that is common to all the services by using the cell-specific broadcast information and to transmit the broadcast information for the service that the specific user terminal uses in message 2 and/or message 4. As a result, it is possible to prevent increase of overhead of the cell-specific broadcast information and enhance the usage efficiency of the communication.

Here, when the user terminal receives information related to a numerology and information related to a broadcast service by the random access procedure, the cell for performing the random access procedure (or CC) may be a cell using the numerology (or the broadcast service) or another cell (for example, LTE RAT, primary cell or the like).

Second Embodiment

In the second embodiment, information directed to a specific user terminal (given broadcast information, aperiodic broadcast information or Aperiodic PBCH) is included in a paging message and is provided from the radio base station to the user terminal.

As described above, in the LTE system, a plurality of types of SIB (for example, SIB 1 to SIB 19) are defined and each SIB is mapped to a different system information message SI (SI window). When system information is changed in the existing communication system, the radio base station uses a paging message (padding information) that indicates change of system information to notify the user terminal of whether or not to change the system information. When receiving the padding information including a change notification of the system information (for example, systemInfoModification), the user terminal performs a change operation of the system information.

In the existing LTE system, a user terminal in an RRC connection mode (RRC connected) and a user terminal in an RRC idle mode are configured with change notification of system information using paging information.

Figure 8:
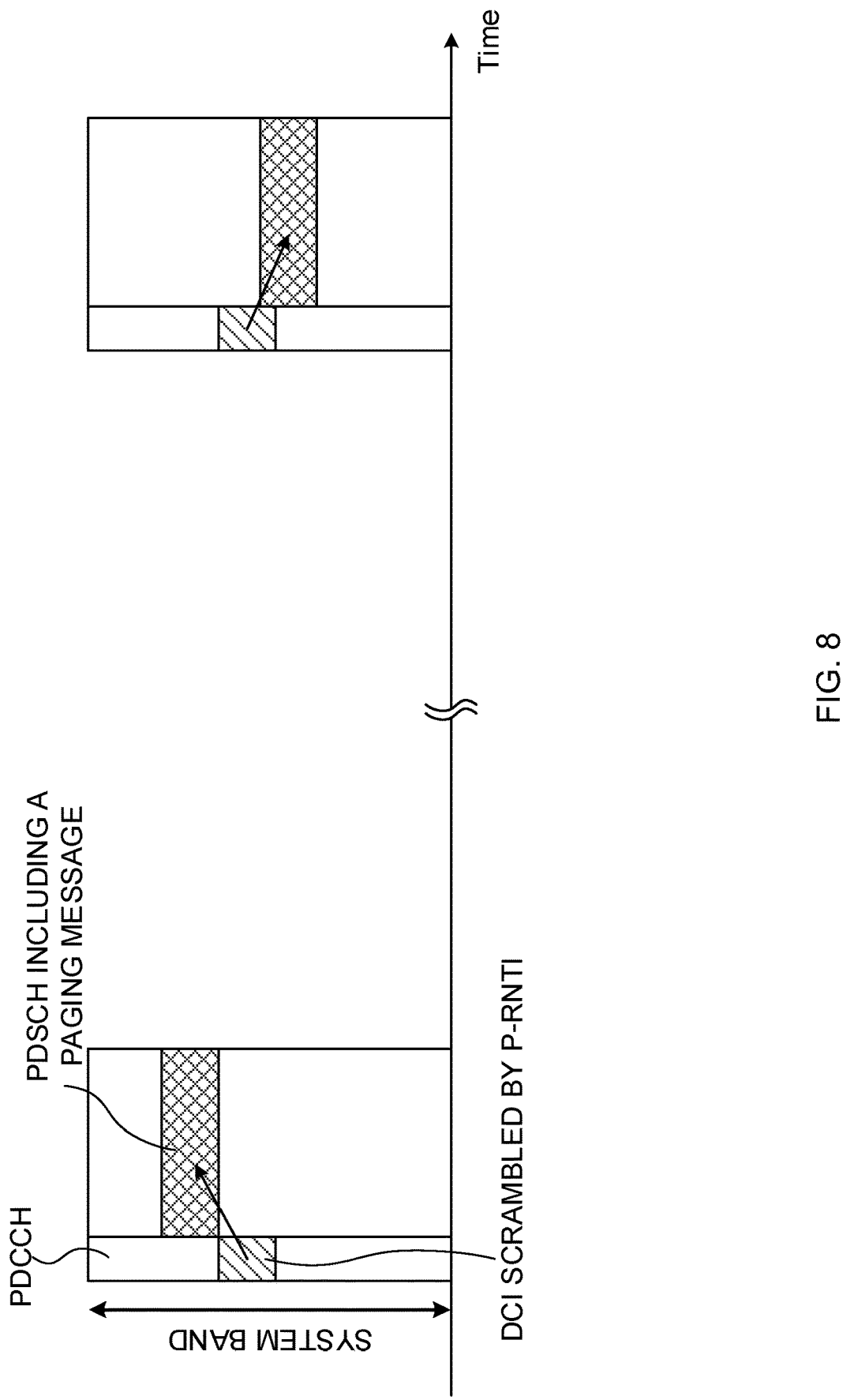
FIG. 8 is a diagram illustrating an example of transmission of paging information in the existing system.

The user terminal in the RRC idle mode detects downlink control information (DCI) transmitted in common search space (Common SS) of a downlink control channel (PDCCH) at a paging timing defined in advance. Then, the user terminal uses scheduling information (DL assignment) included in the DCI as a basis to obtain paging information transmitted in the downlink shared channel (PDSCH) (see FIG. 8). Note that used as DCI is DCI (DCI format 1A, or DCI format 1C) scrambled by a paging identifier (P-RNTI).

The paging timing is determined based on a paging occasion (PO) indicating a subframe to transmit DCI scrambled by P-RNTI and a radio frame including PO (PF: paging frame). The user terminal monitors the paging information based on the PO and PF. The user terminal in the idle mode performs the reception operation only in a period where the paging information needs to be monitored and the user terminal stands in a sleep mode or in a power saving mode during other periods, thereby achieving reduction of power consumption.

The paging information the radio base station transmits may include a paging recode for each user terminal, change indication information of system information (for example, SystemInforModification), ETWS (Earthquake and Tsunami Warning System), CMAS (Commercial Mobile Alert Service), EAB (Extended Access Barring), etc.

When changing the system information in the network, the radio base station is able to instruct the user terminal to change (update) the system information by using the paging information. When receiving the paging information to notify the user terminal of change of the system information (for example, SystemInforModification), the user terminal performs the change operation of the system information. For example, the user terminal that is instructed to change the system information by the paging information performs acquisition of system information of plural SIBs, etc. including the system information (System information acquisition).

Figure 9:
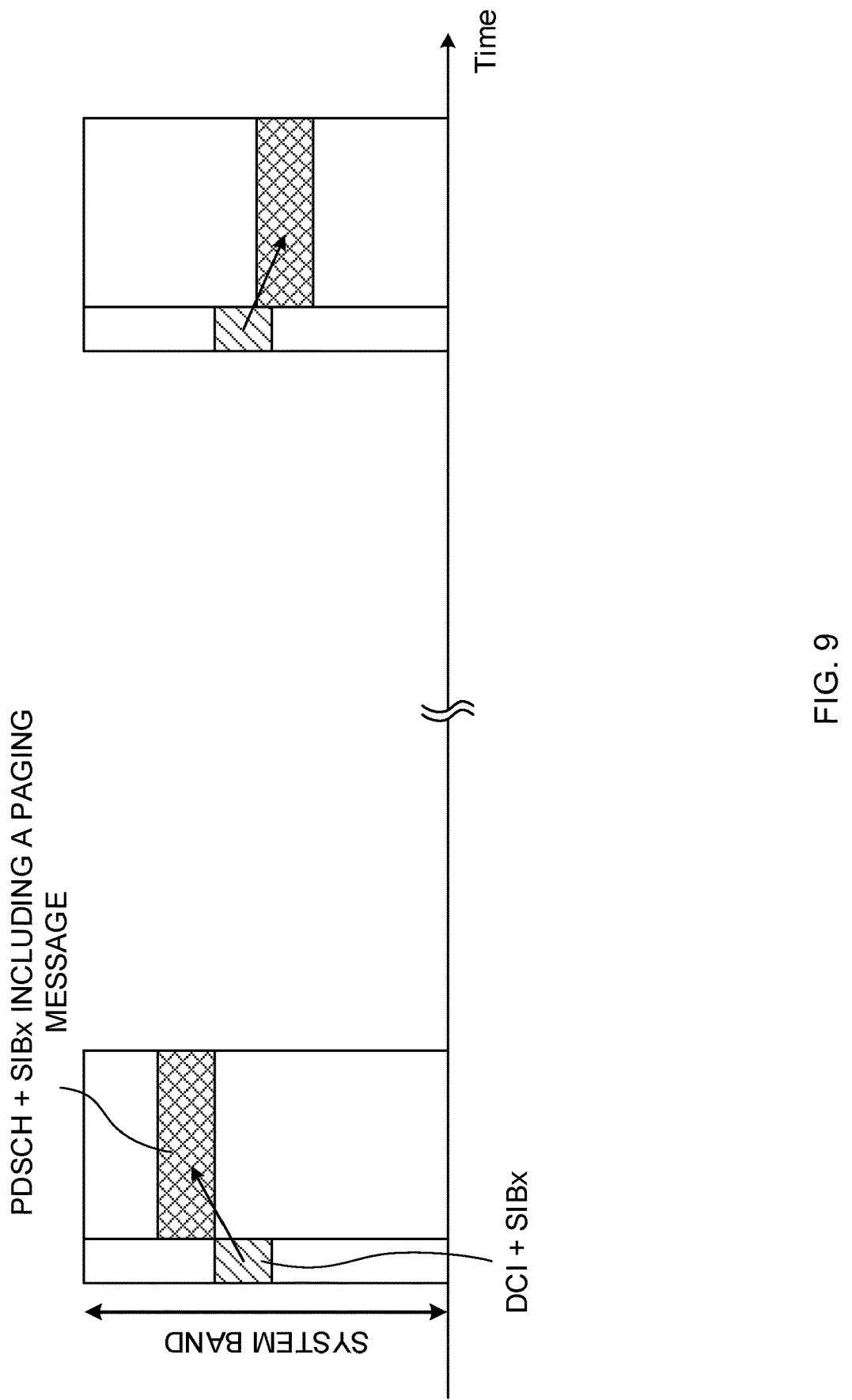
FIG. 9 is a diagram illustrating an example of transmission of the paging information according to a second embodiment.

In the second embodiment, the radio base station provides the user terminal with given broadcast information by using the paging information (see FIG. 9). In this case, the radio base station is able to transmit a downlink control channel (for example, PDCCH, EPDCCH, MPDCCH) for controlling assignment of the paging information and/or a downlink shared channel by including the broadcast information therein.

When including the given broadcast information in the downlink control channel, the radio base station may include another paging message (for example, at least one of change indication information of the system information, ETWS, CMAS, EAB) in the downlink control channel and provide it to the user terminal (see FIG. 10A). When transmitting the broadcast information in the downlink shared channel, the radio base station may multiplex the paging recodes and the given broadcast information and provide it to the user terminal (or the radio base station may include the broadcast information in a paging recode for each user terminal). In this case, the user terminal is able to receive the downlink control information including assignment information of the downlink shared channel by using P-RNTI (see FIG. 10B).

Further, transmission and reception of the paging information may be performed using RNTI defined for a specific user terminal (specific UE group). For example, in transmission of the paging information, the radio base station transmits a downlink control channel masked by a given RNTI that is defined for a specific user terminal. The user terminal receives the downlink control channel by using the given RNTI to obtain the given broadcast information included in the downlink control channel and/or the given broadcast information included in the downlink shared channel assigned by the downlink control channel.

Thus, by configuring RNTI for reception of a paging message for a specific user terminal and controlling transmission and reception of the given broadcast information, the specific user terminal is able to receive the paging information including given broadcast information selectively.

The user terminal may control reception processing of the paging information by using both of the existing P-RNTI and RNTI defined for a specific user terminal or the user terminal may control reception processing of the paging information based on either RNTI in accordance with the user terminal capability.

When the user terminal receives information related to a numerology and information related to a broadcast service, etc. by the paging message, the cell for receiving the paging message (or CC) may be a cell using the numerology (or the broadcast service) or another cell (for example, LTE RAT, primary cell or the like).

(Radio Communication System)

The following description concerns the configuration of a radio communication system according to an embodiment of the present invention. This radio communication system is applied with any and/or combination of the radio communication methods according to the embodiments explained above. The radio communication methods according to the respective embodiments may be applied alone or in combination.

Figure 11:
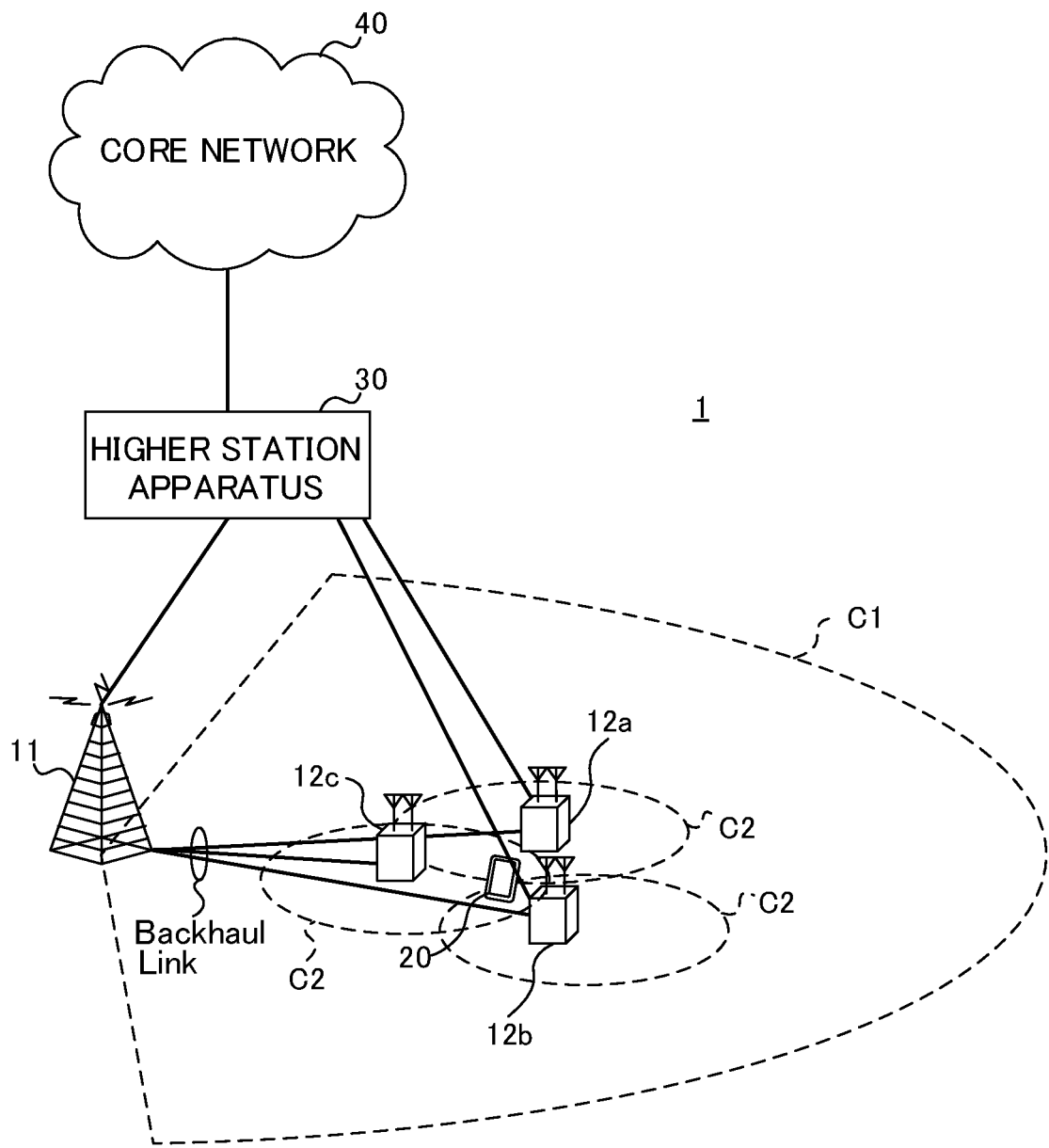
FIG. 11 is a diagram illustrating an example of a schematic configuration of a radio communication system of according to an embodiment of the present invention.

FIG. 11 shows an example of a schematic configuration of the radio communication system according to an embodiment of the present invention. The radio communication system 1 can adopt carrier aggregation (CA) and/or dual connectivity (DC) in which a plurality of fundamental frequency blocks (component carriers) are aggregated and a system bandwidth of the LTE system (for example, 20 MHz) is used as one unit. The radio communication system 1 may be also called SUPER 3G, LTE-A (LTE-Advanced), IMT-Advanced, 4G, 5G, FRA (Future Radio Access).

The radio communication system 1 illustrated in FIG. 11 is configured to include a radio base station 11 forming a macro cell C1 and radio base stations 12a through 12c each being located within the macro cell C1 and forming a small cell C2 that is narrower than the macro cell C1. In the macro cell C1 and each small cell C2, a user terminal 20 is located. Cells may be configured to be applied with different numerologies.

The user terminal 20 is able to connect to both of the radio base station 11 and the radio base stations 12. The user terminal 20 is expected to use the macro cell C1 and the small cell C2 of different frequencies, simultaneously by CA or DC. In addition, the user terminal 20 may apply CA or DC by using a plurality of cells (CCs) (for example, six CCs or more).

Communication between the user terminal 20 and the radio base station 11 can be performed by using a carrier of a relatively low frequency band and a narrow bandwidth (also called, existing carrier, Legacy carrier, etc.). On the other hand, communication between the user terminal 20 and the radio base station 12 can be performed by using a carrier of a relatively high frequency band (for example, 3.5 GHz, 5 GHz, etc.) and a wide bandwidth or by using the same carrier as that used in the communication between the user terminal 20 and the radio base station 11. Note that the configuration of a frequency band used by each radio base station is not limited to this.

Connection between the radio base station 11 and the radio base station 12 (or between the two radio base stations 12) may be wired connection (for example, optical fiber in compliance with CPRI (Common Public Radio Interface), X2 interface, etc.) or may be wireless connection.

The radio base station 11 and each radio base station 12 are connected to a higher station apparatus 30, and is connected to a core network 40 via the higher station apparatus 30. The higher station apparatus 30 includes, but is not limited to, an access gateway apparatus, a radio network controller (RNC), and a mobility management entity (MME), etc. In addition, each radio base station 12 may be connected to the higher station apparatus 30 via the radio base station 11.

The radio base station 11 is a radio base station having a relatively wide coverage ad may be called macro base station, aggregation node, eNB (eNodeB), transmission/reception point, etc. In addition, the radio base station 12 is a radio base station having a local coverage and may be called small base station, micro base station, pico base station, femto base station, HeNB (Home eNodeB), RRH (Remote Radio Head), transmission/reception point, etc. In the following description, the radio base stations 11 and 12 are each called radio base station 10 collectively, unless they are discriminated from each other.

Each user terminal 20 is a terminal supporting various communication schemes such as LTE and LTE-A, or it may include not only a mobile communication terminal, but also a fixed communication terminal.

In the radio communication system 1, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier transmission scheme for performing communication by dividing a frequency band into a plurality of narrow frequency bands (subcarriers) and mapping data to each subcarrier. SC-FDMA is a single carrier transmission scheme to reduce interference between terminals by dividing, per terminal, the system bandwidth into bands formed with one or continuous resource blocks, and allowing a plurality of terminals to use mutually different bands. Note that combination of uplink and downlink radio access schemes is not limited to this, and OFDMA may be applied to uplink.

In the radio communication system 1, used as downlink channels are a downlink shared channel (PDSCH: Physical Downlink Shared Channel) that is used by each user terminal 20 on a shared basis, a broadcast channel (PBCH: Physical Broadcast channel), and a downlink L1/L2 control channel, etc. PDSCH is used to transmit user data and higher layer control information, and an SIB (System Information Block). Furthermore, PBCH is used to transmit an MIB (Master Information Block), etc.

The downlink L1/L2 control channel includes a downlink control channel (a PDCCH (Physical Downlink Control Channel), an EPDCCH (Enhanced Physical Downlink Control Channel)), a PCFICH (Physical Control Format Indicator Channel), and a PHICH (Physical Hybrid-ARQ Indicator Channel), etc. The PDCCH is used to transmit downlink control information (DCI), etc., which includes PDSCH and PUSCH scheduling information. The PCFICH is used to transmit the number of OFDM symbols used in the PDCCH. The PHICH is used to transmit HARQ (Hybrid Automatic Repeat reQuest) retransmission control information for PUSCH (ACK/NACK). The EPDCCH is frequency-division-multiplexed with a PDSCH (downlink shared data channel) and is used for transmitting the DCI like the PDCCH.

In the radio communication system 1, used as uplink channels are an uplink shared channel (PUSCH: Physical Uplink Shared Channel) that is used by each user terminal 20 on a shared basis, an uplink control channel (PUCCH: Physical Uplink Control Channel), and a random access channel (PRACH: Physical Random Access Channel), etc. The PUSCH is used to transmit user data and higher layer control information. The PUSCH or the PUCCH is used to transmit uplink control information (UCI) including at least one of transmission acknowledgement information (ACK/NACK), radio quality information (CQI: Channel Quality Indicator), and so on. The PRACH is used to transmit a random access preamble for establishing connection with a cell.

<Radio Base Station>

Figure 12:
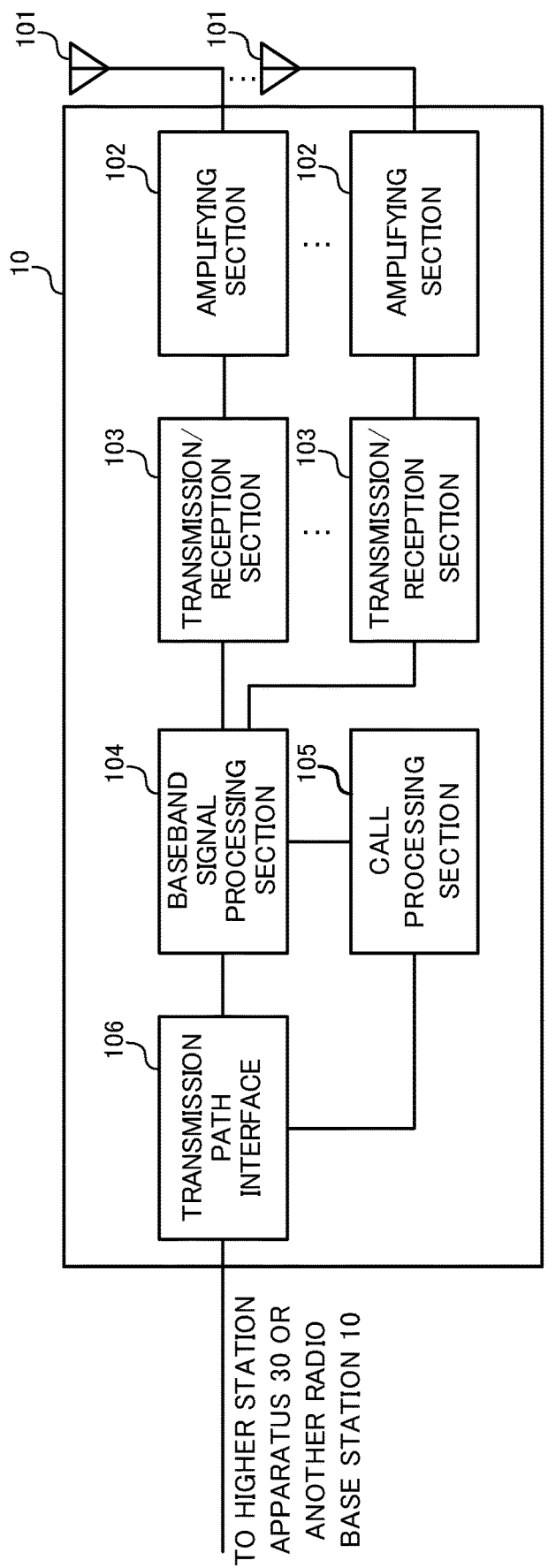
FIG. 12 is a diagram illustrating an overall configuration of a radio base station according to the illustrated embodiment of the present invention.

FIG. 12 is a diagram illustrating an overall configuration of the radio base station according to an embodiment of the present invention. The radio base station 10 is configured to include at least a plurality of transmission/reception antennas 101, amplifying sections 102, transmission/reception sections 103, a baseband signal processing section 104, a call processing section 105 and a transmission path interface 106. Note that the transmission/reception section 103 consists of a transmission section and a reception section.

User data that is to be transmitted on the downlink from the radio base station 10 to the user terminal 20 is input from the higher station apparatus 30, via the transmission path interface 106, into the baseband signal processing section 104.

In the baseband signal processing section 104, in regard to the user data, signals are subjected to PDCP (Packet Data Convergence Protocol) layer processing, RLC (Radio Link Control) layer transmission processing such as division and coupling of user data and RLC retransmission control transmission processing, MAC (Medium Access Control) retransmission control (e.g., HARQ (Hybrid Automatic Repeat reQuest) transmission processing), scheduling, transport format selection, channel coding, inverse fast Fourier transform (IFFT) processing, and precoding processing, and resultant signals are transferred to the transmission/reception sections 103. Furthermore, in regard to downlink control signals, transmission processing is performed, including channel coding and inverse fast Fourier transform, and resultant signals are also transferred to the transmission/reception sections 103.

Each transmission/reception section 103 converts the baseband signals, output from the baseband signal processing section 104 after being precoded per each antenna, to a radio frequency band and transmits this radio frequency band. The radio frequency signals frequency-converted in the transmission/reception section 103 are amplified in the amplifying section 102 and are transmitted from the transmission/reception antenna 101.

The transmission/reception section (transmission section) 103 transmits multiple broadcast information to the user terminal. In addition, the transmission/reception section (transmission section) 103 is able to provide given broadcast information that is a part of the multiple broadcast information to the user terminal by using different operation and timing (for example, random access procedure, paging information and so on) from those of the existing broadcast information (for example, MIB, SIB).

For example, the transmission/reception section (transmission section) 103 is able to transmit a downlink control channel and/or a downlink shared channel by a random access response (message 2) and/or contention resolution (message 4), respectively, by including given broadcast information therein (see FIGS. 4 and 5). In this case, the transmission/reception section (transmission section) 103 is able to transmit a downlink control channel of message 2 by using an identifier for a specific user terminal group (RNTI). Otherwise, the transmission/reception section (transmission section) 103 is able to transmit given broadcast information by using a downlink control channel transmitted by message 0 (see FIG. 6).

In addition, when applying CBRA (Contention Based Random Access), the transmission/reception section (transmission section) 103 is able to transmit given broadcast information by message 4, and when applying non-CBRA, the transmission/reception section (transmission section) 103 is able to transmit given broadcast information by message 0 and/or message 2 (see FIG. 7). In addition, the transmission/reception section (transmission section) 103 is able to transmit, as the given broadcast information, broadcast information depending on the type of the random access preamble transmitted from the user terminal.

Otherwise, the transmission/reception section (transmission section) 103 is able to transmit given broadcast information by using a downlink channel (downlink control channel and/or downlink shared channel) to be used for a paging message (see FIG. 9). Each transmission/reception section 103 may be configured as a transmitter/receiver, a transmission/reception circuit or a transmission/reception device as explained based on common knowledge in the technical field to which the present invention pertains. The transmission/reception section 103 may be configured of an integral transmission/reception section, or may be configured as a transmission section and a reception section.

Whereas, in regard to the uplink signals, radio frequency signals received by each transmission/reception antenna 101 are amplified by each amplifying section 102. The transmission/reception sections 103 receive the uplink signals that are amplified by the amplifying sections 102, respectively. The transmission/reception sections 103 frequency-convert the received signals into baseband signals and the converted signals are then output to the baseband signal processing section 104.

The baseband signal processing section 104 performs FFT (Fast Fourier Transform) processing, IDFT (Inverse Discrete Fourier Transform) processing, error correction decoding, MAC retransmission control reception processing, and RLC layer and PDCP layer reception processing on user data included in the input uplink signals. The signals are then transferred to the higher station apparatus 30 via the transmission path interface 106. The call processing section 105 performs call processing such as setting up and releasing a communication channel, manages the state of the radio base station 10, and manages the radio resources.

The transmission path interface 106 performs transmission and reception of signals with the higher station apparatus 30 via a predetermined interface. Furthermore, the transmission path interface 106 can perform transmission and reception of signals (backhaul signaling) with a neighbor radio base station 10 via an inter-base-station interface (for example, optical fiber or X2 interface compliant with CPRI (Common Public Radio Interface)).

Figure 13:
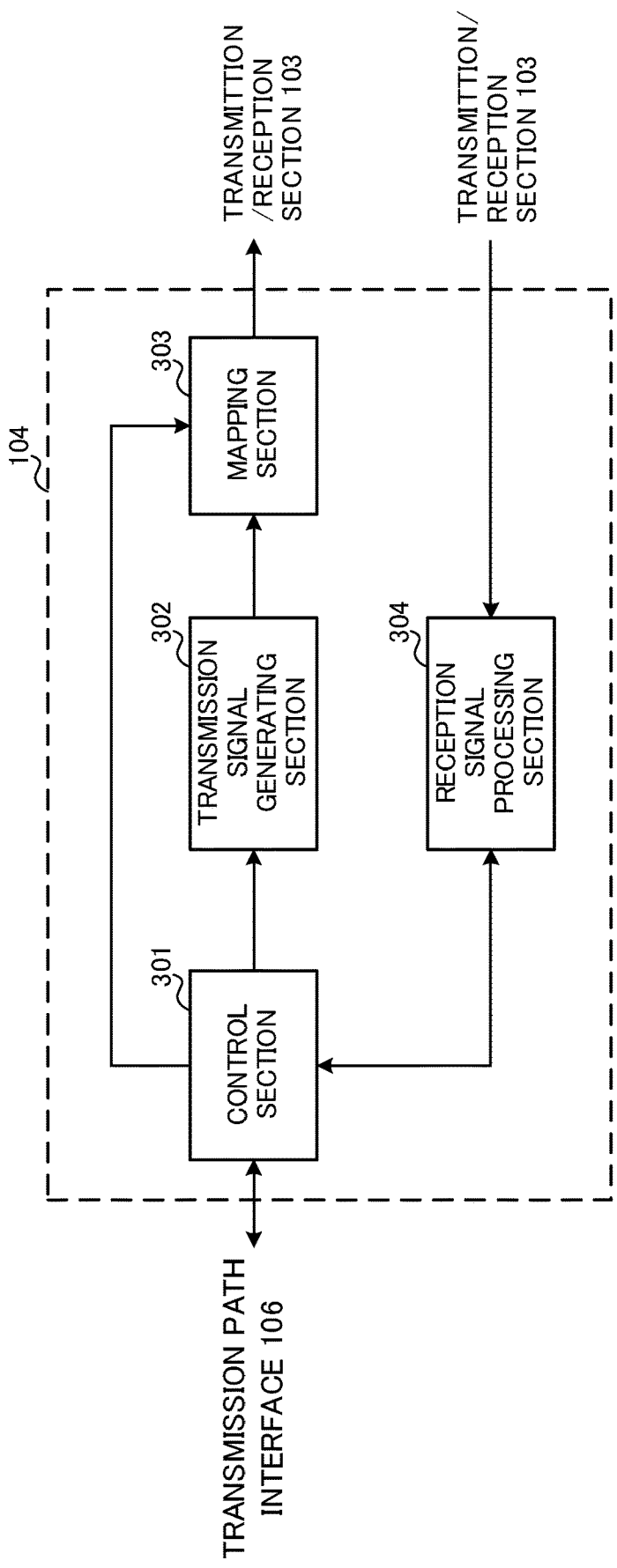
FIG. 13 is a diagram illustrating a functional configuration of the radio base station according to the illustrated embodiment of the present invention.

FIG. 13 is a diagram illustrating the functional configuration of the radio base station according to the illustrated embodiment. Note that although FIG. 13 mainly shows functional blocks of the features of the present embodiment, the radio base station 10 is also provided with other functional blocks that are necessary for carrying out radio communication. As illustrated in FIG. 13, the baseband signal processing section 104 includes a control section (scheduler) 301, a transmission signal generating section (generating section) 302, a mapping section 303, and a reception signal processing section 304.

The control section 301 controls scheduling of downlink data signals to be transmitted by PDSCH and downlink control signals to be transmitted by PDCCH and/or EPDCCH (for example, resource allocation). In addition, the control section 301 controls scheduling of system information, synchronization signals, paging information, CRS (Cell-specific Reference Signal), CSI-RS (Channel State Information Reference Signal), and so on. Further, the control section 301 controls scheduling of uplink reference signals, uplink data signals to be transmitted by PUSCH, uplink control signals to be transmission by PUCCH and/or PUSCH and so on.

The control section 301 is able to control transmission of the transmission/reception section (transmission section) 103. For example, the control section 301 is able to control transmission of message 0, message 2, message 4 in the random access procedure. Further, the control section 301 is able to control transmission of paging messages. The control section 301 may be configured of a controller, a control circuit or a control device as explained based on the common knowledge in the technical field to which the present invention pertains.

The transmission signal generating section 302 generates downlink signals (DL signals including downlink control signals and downlink data signals) based on an instruction from the control section 301 and outputs them to the mapping section 303. Specifically, the transmission signal generating section 302 generates downlink data signals (PDSCH) including user data and outputs them to the mapping section 303. Further, the transmission signal generating section 302 generates downlink control signals (PDCCH/EPDCCH) including DCI (UL grant) and output them to the mapping section 303. The transmission signal generating section 302 generates downlink reference signals such as CRS, CSI-RS and outputs them to the mapping section 303.

The mapping section 303 maps a downlink signal generated by the transmission signal generating section 302 to a given radio resource based on an instruction from the control section 301 and outputs the signal to the transmission/reception section 103. The mapping section 303 may be configured of a mapper, a mapping circuit or a mapping device as explained based on common knowledge in the technical field to which the present invention pertains.

The reception signal processing section 304 performs reception processing (for example, demapping, demodulation, decoding, etc.) on a UL signal input from the user terminal 20. Here, a processing result is output to the control section 301. The reception signal processing section 304 may be configured of a signal processor, a signal processing circuit or a signal processing device, a measuring unit, a measuring circuit or a measuring device as explained based on common knowledge in the technical field to which the present invention pertains.

<User Terminal>

Figure 14:
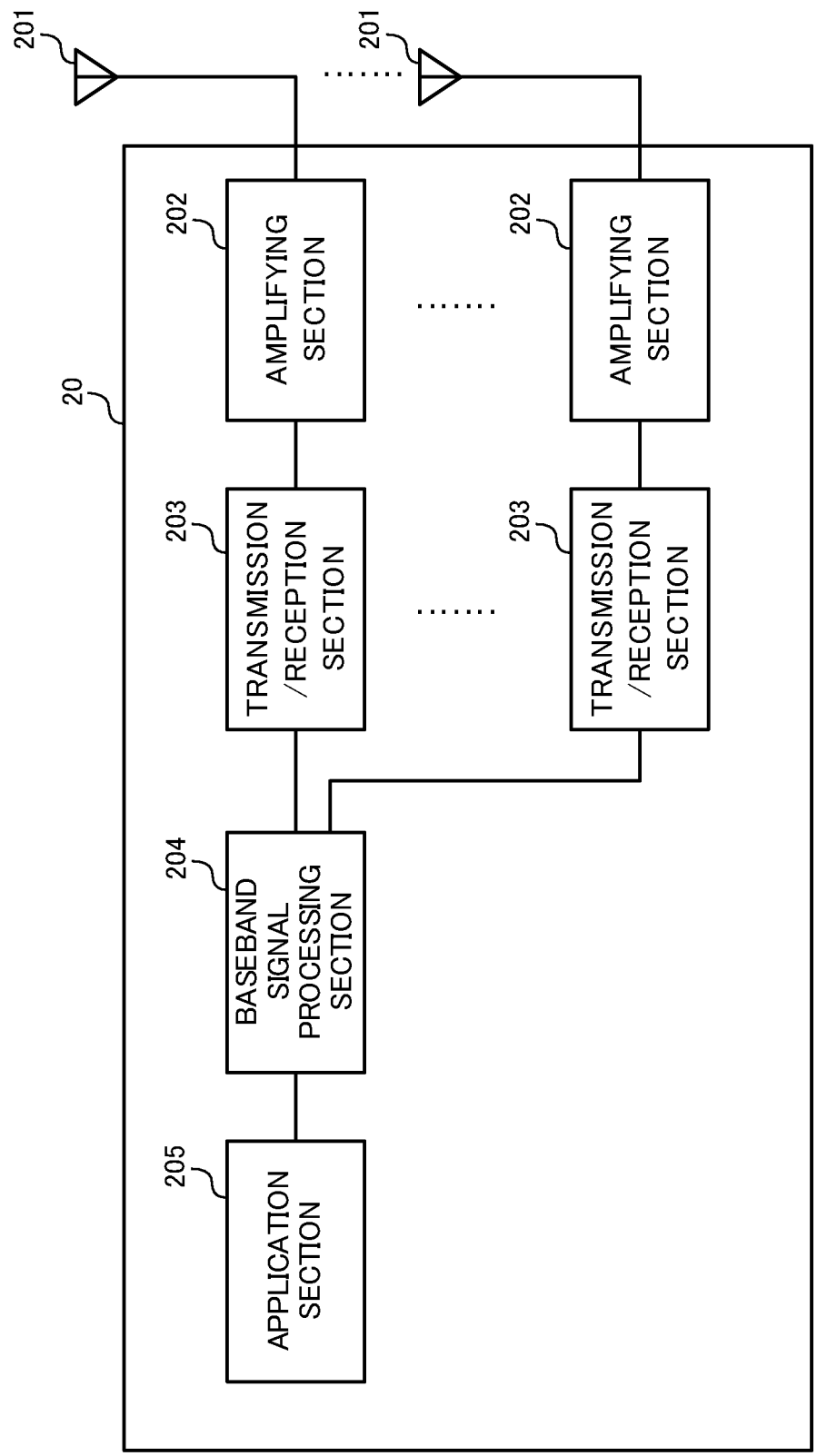
FIG. 14 is a diagram illustrating an overall configuration of a user terminal according to the illustrated embodiment of the present invention.

FIG. 14 is a diagram showing an overall structure of a user terminal according to an embodiment of the present invention. The user terminal 20 is provided at least with a plurality of transmission/reception antennas 201, amplifying sections 202, transmission/reception sections 203, a baseband signal processing section 204 and an application section 205. Each transmission/reception section 203 may be configured of a transmission section and a reception section.

Radio frequency signals that are received in the transmission/reception antennas 201 are respectively amplified in the amplifying sections 202. Each transmission/reception section 203 receives a downlink signal that has been amplified by an associated amplifying section 202. The transmission/reception sections 203 perform frequency conversion on the reception signals to convert into baseband signals and output them to the baseband signal processing section 204.

The transmission/reception section (reception section) 203 transmits a plurality of broadcast information pieces transmitted from the radio base station. Further, the transmission/reception section (reception section) 203 is able to receive given broadcast information that is a part of the plurality of broadcast information pieces at different operation and timing (for example, random access procedure, paging information, etc.) from the existing broadcast information (for example, MIB, SIB).

For example, the transmission/reception section (reception section) 203 is able to receive given broadcast information in a downlink control channel and/or a downlink shared channel transmitted from a random access response (message 2) and/or a contention resolution (message 4), respectively (see FIGS. 4 and 5). In this case, the transmission/reception section (reception section) 203 is able to perform reception of the downlink control channel of message 2 by using an identifier (RNTI) for a specific user terminal group. Otherwise, the transmission/reception section (reception section) 203 is able to receive given broadcast information in a downlink control channel transmitted in message 0 (see FIG. 6).

Further, when applying contention-based random access, the transmission/reception section (reception section) 203 is able to receive given broadcast information in message 4, and when applying contention-free random access, the transmission/reception section (reception section) 203 is able to receive given broadcast information in message 0 and/or message 2 (see FIG. 7). Further, the transmission/reception section (reception section) 203 is able to receive, as given broadcast information, broadcast information which content corresponds to a type of the random access preamble.

Otherwise, the transmission/reception section (reception section) 203 is able to transmit given broadcast information included in a downlink channel (downlink control channel and/or downlink shared channel) used for the paging message (see FIG. 9). The transmission/reception section 203 may be configured of a transmitter/receiver, a transmission/reception circuit or a transmission/reception device as explained based on common knowledge in the technical field to which the present invention pertains.

The input baseband signal is subjected to an FFT process, error correction decoding, a retransmission control receiving process, etc., in the baseband signal processing section 204. The downlink user data is forwarded to the application section 205. The application section 205 performs processes related to higher layers above the physical layer and the MAC layer. Furthermore, out of the downlink data, broadcast information is also forwarded to the application section 205.

On the other hand, uplink user data is input to the baseband signal processing section 204 from the application section 205. In the baseband signal processing section 204, a retransmission control transmission process (for example, HARQ transmission process), channel coding, precoding, a discrete fourier transform (DFT) process, an inverse fast fourier transform (IFFT) process, etc., are performed, and the result is forwarded to each transmission/reception section 203. The transmission/reception section 203 converts a baseband signal output from the baseband signal processing section 204 into a radio frequency band and transmits the resultant signal. The radio frequency signal frequency-converted in the transmission/reception section 203 is amplified by the amplifying section 202 and is transmitted from the transmission/reception antenna 201.

Figure 15:
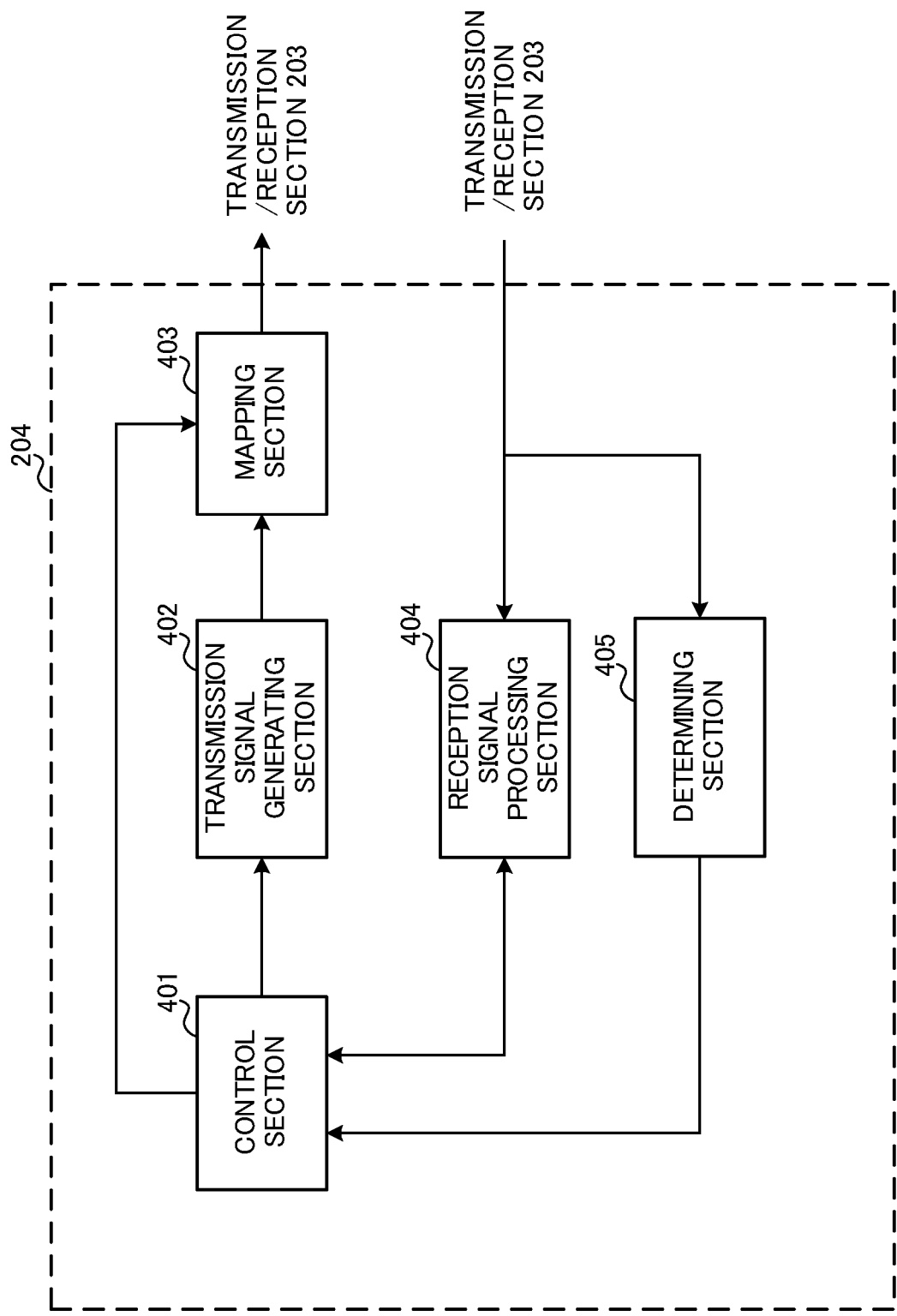
FIG. 15 is a diagram illustrating a functional configuration of the user terminal according to the illustrated embodiment of the present invention.

FIG. 15 is a diagram illustrating the functional configuration of the user terminal according to an embodiment of the present invention. Note that FIG. 15 mainly shows functional blocks of the features of the present embodiment, and the user terminal 20 is also provided with other functional blocks that are necessary for carrying out radio communication. As illustrated in FIG. 15, the baseband signal processing section 204 provided in the user terminal 20 includes a control section 401, a transmission signal generating section 402, a mapping section 403, a reception signal processing section 404 and a determining section 405.

The control section 401 obtains, from the reception signal processing section 404, a downlink control signal (signal transmitted by PDCCH/EPDCCH) and a downlink data signal (signal transmitted by PDSCH) transmitted from the radio base station 10. The control section 401 controls generation of an uplink control signal (for example, transmission acknowledgement signal (HARQ-ACK) or the like) and an uplink data signal based on a result of determining whether or not retransmission control is required for a downlink control signal and a downlink data signal.

The control section 401 is able to perform reception processing of a downlink control channel transmitted in message 2 and/or message 4 in the random access procedure by using an identifier (RNTI) for a specific user terminal group. The control section 401 may be configured of a controller, a control circuit or a control device as explained based on common knowledge in the technical field to which the present invention pertains.

The transmission signal generating section 402 generates uplink signals based on an instruction from the control section 401 and outputs the signals to the mapping section 403. For example, the transmission signal generating section 402 generates uplink control signals such as a transmission acknowledgement signal (HARQ-ACK) and channel state information (CSI), etc. based on an instruction from the control section 401.

For example, the transmission signal generating section 402 generates an uplink data signal based on an instruction from the control section 401. For example, when receiving, from the radio base station 10, a downlink control signal including UL grant, the transmission signal generating section 402 is instructed to generate an uplink data signal by the control section 401. The transmission signal generating section 402 may be configured of a signal generator, a signal generating circuit or a signal generating device as explained based on common knowledge in the technical field to which the present invention pertains.

The mapping section 403 maps a UL signal (an uplink control signal and/or an uplink data signal) generated by the transmission signal generating section 402, based on an instruction from the control section 401, to a radio resource and outputs the generated signal to the transmission/reception section 203. The mapping section 403 may be configured of a mapper, a mapping circuit or a mapping device as explained based on the common knowledge in the technical field to which the present invention pertains.

The reception signal processing section 404 performs reception processing (e.g., demapping, demodulation, decoding, etc.) on a DL signal (for example, a downlink control signal transmitted from the radio base station and a downlink data signal transmitted by PDSCH, etc.). The reception signal processing section 404 outputs information received from the radio base station 10, to the control section 401 and the determining section 405. The reception signal processing section 404 outputs, for example, broadcast information, system information, RRC signaling, DCI and so on to the control section 401.

The reception signal processing section 404 may be configured of a signal processor, a signal processing circuit or a signal processing device or a measurement unit, a measurement circuit or a measurement device as explained based on the common knowledge in the technical field to which the present invention pertains. Further, the reception signal processing section 404 may comprise a reception section according to the present invention.

The determining section 405 performs retransmission control determination (ACK/NACK) based on a decoding result of the reception signal processing section 404 and outputs a determination result to the control section 401. If downlink signals (PDSCHs) are transmitted from a plurality of CCs (for example, 6 or more CCs), the determining section 405 performs retransmission control determination (ACK/NACK) for each of the CCs and outputs the result to the control section 401. The determining section 405 may be configured of a determining circuit or a determining device as explained based on the common knowledge in the technical field to which the present invention pertains.

(Hardware Configuration)

Furthermore, the block diagrams used in the above description of the present embodiments indicate function-based blocks. These functional blocks (configured sections) are implemented via any combination of hardware and/or software. Furthermore, the implementation of each functional block is not limited to a particular means. In other words, each functional block may be implemented by a single device that is physically connected, or implemented by two or more separate devices connected by a fixed line or wirelessly connected.

Figure 16:
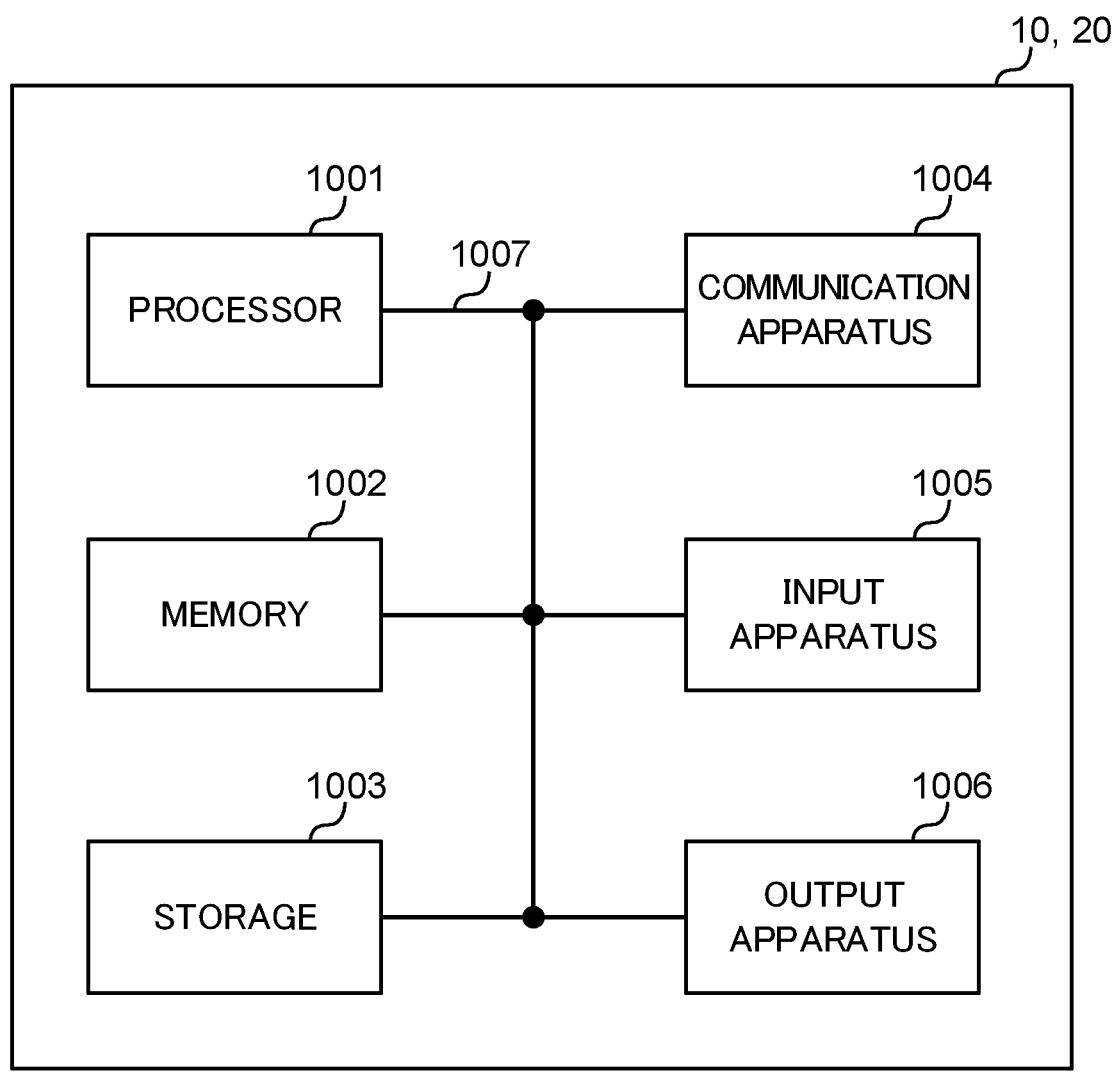
FIG. 16 is a diagram illustrating the hardware configuration of the radio base station and the user terminal according to the illustrated embodiment.

For example, the radio base station and the user terminal according to an embodiment of the present invention may function as a computer that performs processing of the radio communication method of the present invention. FIG. 16 is a diagram illustrating an example of the hardware configuration of the radio base station and the user terminal according to an embodiment of the present invention. The above-described radio base station 10 and user terminal 20 may be configured physically of a computer device including a processor 1001, a memory 1002, a storage 1003, a communication apparatus 1004, an input apparatus 1005, an output apparatus 1006, a bus 1007 and so on.

Note that in the following description, the term "apparatus" may be replaced with a circuit, a device, a unit or the like. The hardware configuration of the user terminal 20 and the radio base station 10 may be configured to include one or a plurality of apparatuses illustrated in the drawings or may be configured not including a part of the apparatuses.

Each function in the radio base station 10 and the user terminal 20 is realized by reading given software (program) to hardware of the processor 1001, the memory 1002 or the like, operating by the processor 1001, and controlling communication by the communication apparatus 1004 and data reading and/or writing in the memory 1002 and storage 1002.

For example, the processor 1001 controls the computer as a whole by operating an operating system. The processor 1001 may be configured of a central processing unit (CPU) including a register, an operating apparatus, a control apparatus, interface with a peripheral device and the like. For example, the above-mentioned baseband signal processing section 104 (204) and call processing section 105, etc. may be implemented by the processor 1001.

Further, the processor 1001 reads programs (program codes), software module and data from the storage 1003 and/or communication apparatus 1004 to the memory 1002 and uses this as a basis to execute various processing. The programs include programs to make the computer operate at least a part of the operations explained in the embodiments above. For example, the control section 401 of the user terminal 20 is stored in the memory 1002 and may be realized by a control program operating in the processor 1001 and other functional blocks may be also implemented in the same manner.

The memory 1002 is a computer readable recoding medium, and, for example, may be configured of at least one of ROM (Read Only Memory), EPROM (Erasable Programmable ROM), RAM (Random Access Memory) and so on. The memory 1002 may be called a resister, cache, main memory (main storage device) or the like. The memory 1002 may hold executable programs (program code), software module and so on to implement the radio communication method according to an embodiment of the present invention.

The storage 1003 is a computer readable storage medium and may be configured of at least one of an optical disk such as CD-ROM (Compact Disc ROM), hard disk drive, flexible disk, magnetic optical disk, flash memory and the like. The storage 1003 may be called auxiliary storage device.

The communication apparatus 1004 is hardware (transmission/reception device) for performing communication between computers via wire and/or wireless network and may be called network device, network controller, network card, communication module or the like. For example, the above-mentioned transmission/reception antennas 101 (201), amplifying sections 102(202), transmission/reception sections 103(203), transmission path interface 106 and so on may be configured in the communication apparatus 1004.

The input apparatus 1005 is an input device receiving an input from the outside (for example, keyboard, mouse, etc.). The output device 1006 is an output device (for example, display, speaker, etc.) for executing output to the outside. The input apparatus 1005 and output apparatus 1006 may be configured integrally (for example, touch panel).

Further, various apparatuses including the processor 1001 and the memory 1002 are connected by a bus 1007 for information communication. The bus 1007 may be configured of a single bus or buses that are different between apparatuses.

In addition, the radio base station 10 and the user terminal 20 may be configured to include hardware such as a micro processor, a digital signal processor 'DSP), ASIC (Application Specific Integrated Circuit), PLD (Programmable Logic Device), and FPGA (Field Programmable Gate Array), or the hardware may be used to realize a part or all of the functional blocks. For example, the processor 1001 may be implemented by at least one of these hardware units.

Note that technical terms discussed in the present specification and/or technical terms necessary for understanding the present specification may be replaced with technical terms having the same or similar meaning. For example, channel and/or symbol may be signals (signaling). Furthermore, a signal may be a message. Furthermore, component carrier (CC) may be called a cell, frequency carrier or a carrier frequency, etc.

The radio frame may be configured of one or a plurality of time period (frames) in the time domain. The one or plural time periods (frames) each constitutes a radio frame and may be called a subframe. Further, the subframe may be configured of one or a plurality of slots in the time domain. Further, the slot may be configured of one or a plurality of symbols (OFDM symbols, SC-FDMA symbols, etc.) in the time domain.

The radio frame, subframe, slot and symbol each represent a time unit for signal transmission. The radio frame, subframe, slot and symbol may be called different names, respectively. For example, one subframe may be a transmission time interval (TTI), or continuous subframes may be called TTI, or one slot may be called TTI. That is, the subframe and TTI may be a subframe (1 ms) in the existing LTE, may be shorter than 1 ms (for example, 1-13 symbols) or may be longer than 1 ms.

Here, TTI denotes the minimum time unit for scheduling in radio communication. For example, the scheduling in the LTE system is such that a radio base station allocates to each user terminal radio resources (such as frequency bandwidth and transmission power available for each user terminal) on a TTI basis. The definition of TTI is not limited to this.

Resource block (RB) is a resource allocation unit in the time domain and frequency domain and may include one or a plurality of continuous subcarriers in the frequency domain. Besides, RB may include one or a plurality of symbols in the time domain and may be one slot, one subframe or one TTI length. One TTI and one subframe may be configured of one or a plurality of resource blocks. RB may be called physical resource block (PRB: Physical RB), PRB pair, RB pair or the like.

Further, resource block may be configured of one or a plurality of resource elements (REs). For example, one RE may be a radio resource area of one subcarrier and one symbol.

The above-described configuration of a radio frame, a subframe, a slot and a symbol is merely given by way of example. For example, the number of subframes included in a radio frame, the number of slots included in a subframe, the numbers of symbols and RBs included in a slot, the number of subcarriers included in an RB, the number of symbols in TTI, the symbol length, cyclic prefix (CP) length may be modified variously and appropriately.

Furthermore, information and parameters, etc., discussed in the present specification may be expressed as absolute values, or as a relative value with respect to a predetermined value, or expressed as other corresponding information. For example, a radio resource may be indicated as a given index.

Information and signals, etc., discussed in the present specification may be expressed using any one of various different technologies. For example, data, instructions, commands, information, signals, bits, symbols, chips, etc., that could be referred to throughout the above description may be expressed as voltage, current, electromagnetic waves, a magnetic field or magnetic particles, optical field or photons, or a desired combination thereof.

Furthermore, software, instructions, information and so on may be transmitted and received via a transmission medium. For example, when software is transmitted from a website, server or another remote source by using wired technology (coaxial cable, optical fiber cable, twist pair and digital subscriber line (DSL), etc.) and/or wireless technology (infra-red radiation, micro wave, etc.), these wired and/or wireless technologies are included in the definition of the transmission medium.

The radio base station in the present description may be replaced with and read as a user terminal. For example, assume that communication between the radio base station and the user terminal is replaced with communication between a plurality of user terminals (D2D: Device-to-Device). The above-mentioned embodiments and aspects may be applied to such a configuration. In this case, the above-mentioned functions provided in the radio base station 10 may be configured to be provided in the user terminal 20. In addition, the terms "uplink" and "downlink" may be replaced with "sides". For example, the uplink channel may be replaced with and read as a side channel.

Likewise, the user terminal in the present description may be replaced with and read as the radio base station. In this case, the above-mentioned functions provided in the user terminal 20 may be configured to be provided in the radio base station 10.

The above-described aspects/embodiments of the present invention may be used independently, used in combination, or may be used by switching therebetween when being implemented. Furthermore, notification of predetermined information (e.g., notification of "is X") does not need to be explicit, but may be implicitly (e.g., by not notifying the predetermined information) carried out.

Notification of information is not limited to the aspects/embodiments of the present invention, and such notification may be carried out via a different method. For example, notification of information may be implemented by physical layer signaling (e.g., DCI (Downlink Control Information), UCI (Uplink Control Information)), higher layer signaling (e.g., RRC (Radio Resource Control) signaling, broadcast information (MIB (Master Information Block), SIB (System Information Block)) MAC (Medium Access Control) signaling,), by other signals or a combination thereof. Furthermore, RRC signaling may be called a "RRC message" and may be, e.g., an RRC connection setup (RRCConnectionSetup) message, or an RRC connection reconfiguration (RRCConnectionReconfiguration) message, etc. The MAC signaling may be, for example, given by MAC control element (MAC CE).

The above-described aspects/embodiments of the present invention may be applied to a system that utilizes LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), or other suitable systems and/or to an enhanced next-generation system that is based on any of these systems.

The order of processes, sequences and flowcharts, etc., in the above-described aspects/embodiments of the present invention can have a switched order so long as no contradictions occur. For example, each method described in the present specification proposes an example of an order of various steps but are not limited to the specified order thereof.

Up to this point, the present invention has been described in detail, however, it would be apparent for a person of ordinary skill in the art that the present invention is not limited to the embodiments described herein. For example, the above-described embodiments may be adopted alone or in combination. The present invention can be embodied in various modified or altered forms without departing from the sprit or scope of the present invention defined by claims. Accordingly, the description is given only for illustrative purposes and is by no means intended to limit the present invention.

The disclosure of Japanese Patent Application No. 2016-006549, filed on Jan. 15, 2016, including the specification, drawings, and abstract, is incorporated herein by reference in its entirety.

The invention claimed is:

1. A terminal comprising:
   a transmitter that transmits a random access preamble in at least one resource, of resources that are respectively associated with a plurality of services the terminal wishes to use; and
   a receiver that receives system information to use at least one of the plurality of services the terminal wishes to use, the system information corresponding to the at least one resource in which the random access preamble is transmitted,
   wherein the receiver receives the system information by use of a random access response or a contention resolution message, a type of the system information, that is received by use of the random access response or the contention resolution message, corresponds to:
the at least one resource in which the random access preamble is transmitted, and
the at least one of the plurality of services the terminal wishes to use,
the plurality of services the terminal wishes to use are respectively associated with different random access preamble resources the terminal wishes to use,
the terminal transmits the random access preamble in the resource corresponding to the type of the system information, and
the resource comprises a frequency bandwidth and one or more time-domain symbols available for transmitting the random access preamble.

2. The terminal according to claim 1, wherein the receiver receives the system information based on a random access response corresponding to the random access preamble.

3. A radio communication method, for a terminal, comprising:
transmitting a random access preamble in at least one resource, of resources that are respectively associated with a plurality of services the terminal wishes to use; and
receiving system information to use at least one of the plurality of services the terminal wishes to use, the system information corresponding to the at least one resource in which the random access preamble is transmitted,
wherein the system information is received by use of a random access response or a contention resolution message,
a type of the system information, that is received by use of the random access response or the contention resolution message, corresponds to:
the at least one resource in which the random access preamble is transmitted, and
the at least one of the plurality of services the terminal wishes to use,
the plurality of services the terminal wishes to use are respectively associated with different random access preamble resources the terminal wishes to use,
the transmitting transmits the random access preamble in the resource corresponding to the type of the system information, and
the resource comprises a frequency bandwidth and one or more time-domain symbols available for transmitting the random access preamble.

4. A base station comprising:
a receiver that receives a random access preamble in at least one resource, of resources that are respectively associated with a plurality of services a terminal wishes to use; and
a transmitter that transmits system information to use at least one of the plurality of services the terminal wishes to use, the system information corresponding to the at least one resource in which the random access preamble is received,
wherein the transmitter transmits the system information by use of a random access response or a contention resolution message,
a type of the system information, that is transmitted by use of the random access response or the contention resolution message, corresponds to:
the at least one resource in which the random access preamble is received, and
the at least one of the plurality of services the terminal wishes to use,
the plurality of services the terminal wishes to use are respectively associated with different random access preamble resources the terminal wishes to use,
the base station receives the random access preamble in the resource corresponding to the type of the system information, and
the resource comprises a frequency bandwidth and one or more time-domain symbols available for receiving the random access preamble.

5. A system comprising a terminal and a base station, wherein
the terminal comprises:
a transmitter that transmits a random access preamble in at least one resource, of resources that are respectively associated with a plurality of services the terminal wishes to use; and
a receiver that receives system information to use at least one of the plurality of services the terminal wishes to use, the system information corresponding to the at least one resource in which the random access preamble is transmitted, and
the base station comprises:
a receiver that receives the random access preamble in the at least one resource, of the resources that are respectively associated with the plurality of services the terminal wishes to use; and
a transmitter that transmits the system information to use at least one of the plurality of services the terminal wishes to use, the system information corresponding to the at least one resource in which the random access preamble is received,
wherein the receiver of the terminal receives the system information by use of a random access response or a contention resolution message,
wherein a type of the system information, that is received by use of the random access response or the contention resolution message, corresponds to:
the at least one resource in which the random access preamble is transmitted, and
the at least one of the plurality of services,
the plurality of services the terminal wishes to use are respectively associated with different random access preamble resources the terminal wishes to use,
the terminal transmits the random access preamble in the resource corresponding to the type of the system information, and
the resource comprises a frequency bandwidth and one or more time-domain symbols available for transmitting the random access preamble.

* * * * *